US012641524B2

(12) United States Patent
Yi et al.

(10) Patent No.: US 12,641,524 B2
(45) Date of Patent: May 26, 2026

(54) METHOD AND DEVICE FOR SAVING ENERGY IN WIRELESS COMMUNICATION SYSTEM

(71) Applicant: Samsung Electronics Co., Ltd., Suwon-si (KR)

(72) Inventors: Junyung Yi, Suwon-si (KR); Youngbum Kim, Suwon-si (KR); Cheolkyu Shin, Suwon-si (KR); Hyewon Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 345 days.

(21) Appl. No.: 18/305,696

(22) Filed: Apr. 24, 2023

(65) Prior Publication Data

US 2023/0354163 A1      Nov. 2, 2023

(30) Foreign Application Priority Data

Apr. 29, 2022      (KR) ........................ 10-2022-0053231

(51) Int. Cl.
*H04W 48/12* (2009.01)
*H04W 52/02* (2009.01)
*H04W 72/232* (2023.01)

(52) U.S. Cl.
CPC ........... *H04W 48/12* (2013.01); *H04W 52/02* (2013.01); *H04W 72/232* (2023.01)

(58) Field of Classification Search
CPC .... H04W 48/12; H04W 52/02; H04W 72/232
See application file for complete search history.

(56) References Cited

U.S. PATENT DOCUMENTS

2020/0229115 A1      7/2020   Qi
2021/0051584 A1      2/2021   Cheng et al.
2021/0120508 A1      4/2021   Liu
(Continued)

FOREIGN PATENT DOCUMENTS

WO      2021/020838 A1      2/2021
WO      2022/027309 A1      2/2022

OTHER PUBLICATIONS

Huawei, New SI: Study on network energy savings for NR, RP-213554, 3GPP TSG RAN Meeting #94e, Dec. 10, 2021, Electronic Meeting.
(Continued)

*Primary Examiner* — Kamran Afshar
(74) *Attorney, Agent, or Firm* — Jefferson IP Law, LLP

(57)      ABSTRACT

The disclosure relates to a $5^{th}$ generation (5G) or $6^{th}$ generation (6G) communication system for supporting a higher data transmission rate. A method performed by a user equipment (UE) in a wireless communication system is provided. The method includes receiving, from a base station, first configuration information about a synchronization signal block (SSB), receiving, from the base station, second configuration information about the SSB, the second configuration information including information indicating whether to cancel SSB transmission, and determining whether to receive the SSB based on the first configuration information and the second configuration information.

20 Claims, 14 Drawing Sheets

(56) References Cited

U.S. PATENT DOCUMENTS

| 2021/0243703 | A1* | 8/2021 | Wolf | H04L 5/0094 |
|---|---|---|---|---|
| 2021/0392593 | A1 | 12/2021 | Nagarajan et al. | |
| 2022/0123879 | A1 | 4/2022 | Munier et al. | |
| 2022/0150836 | A1 | 5/2022 | Seo et al. | |
| 2023/0189250 | A1* | 6/2023 | Go | H04L 5/14 |
| | | | | 370/329 |
| 2023/0199659 | A1* | 6/2023 | Zhou | H04L 5/0078 |
| | | | | 370/318 |
| 2023/0308239 | A1* | 9/2023 | Sakhnini | H04L 5/0051 |

OTHER PUBLICATIONS

Mediatek Inc., Adaptation Designs for NR UE Power Saving_final, R1-1900192, 3GPP TSG RAN WG1 Ad-Hoc Meeting 1901, Jan. 12, 2019, Taipei, Taiwan.
3rd Generation Partnership Project; Technical Specification Group Radio Access Network; NR; Physical layer procedures for control (Release 17), 3GPP TS 38.213 V17.1.0, Apr. 7, 2022.
3rd Generation Partnership Project; Technical Specification Group Radio Access Network; Study on self evaluation towards IMT-2020 submission (Release 17), 3GPP TR 37.910 V17.0.0, Apr. 7, 2022.
International Search Report dated Jul. 14, 2023, issued in International Application No. PCT/KR2023/005568.
CENC, Discussion on network energy saving techniques, R1-2204043, XP 52137469, 3GPP TSG RAN WG1 #109e, e-meeting, Apr. 24, 2022.
Extended European Search Report dated Jul. 2, 2025, issued in European Patent Application No. 23796746.8.

* cited by examiner

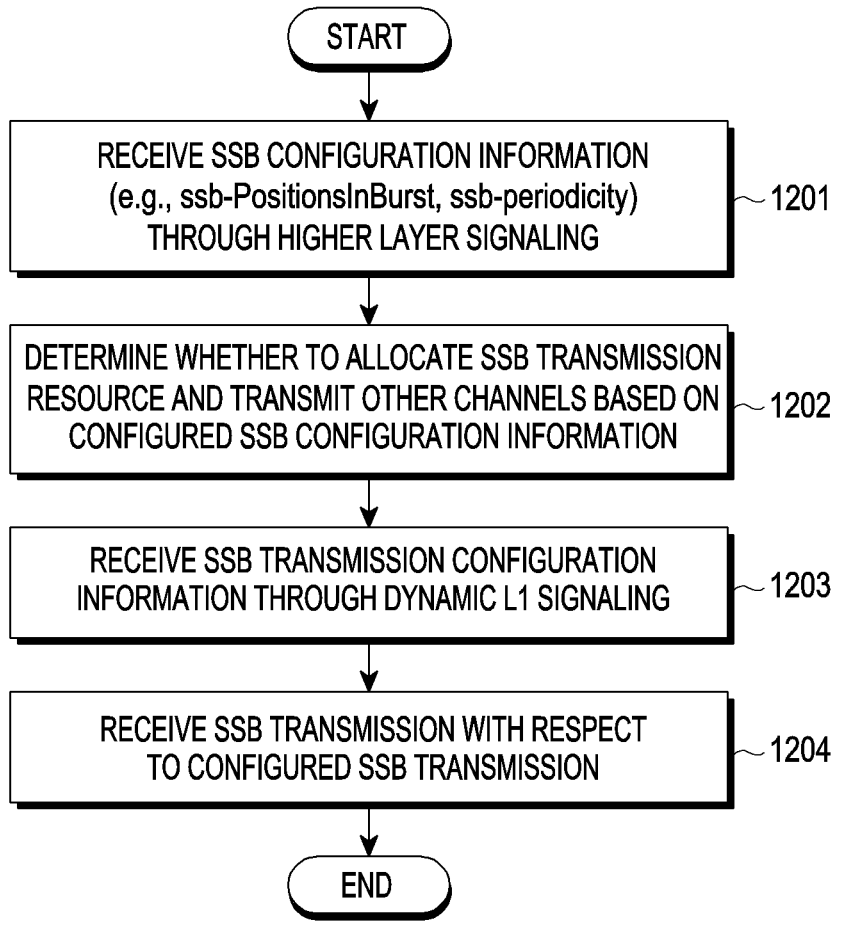

START

RECEIVE SSB CONFIGURATION INFORMATION (e.g., ssb-PositionsInBurst, ssb-periodicity) THROUGH HIGHER LAYER SIGNALING ~1201

DETERMINE WHETHER TO ALLOCATE SSB TRANSMISSION RESOURCE AND TRANSMIT OTHER CHANNELS BASED ON CONFIGURED SSB CONFIGURATION INFORMATION ~1202

RECEIVE SSB TRANSMISSION CONFIGURATION INFORMATION THROUGH DYNAMIC L1 SIGNALING ~1203

RECEIVE SSB TRANSMISSION WITH RESPECT TO CONFIGURED SSB TRANSMISSION ~1204

END

METHOD AND DEVICE FOR SAVING ENERGY IN WIRELESS COMMUNICATION SYSTEM

CROSS-REFERENCE TO RELATED APPLICATION(S)

This application is based on and claims priority under 35 U.S.C. § 119(a) of a Korean patent application number 10-2022-0053231, filed on Apr. 29, 2022, in the Korean Intellectual Property Office, the disclosure of which is incorporated by reference herein in its entirety.

BACKGROUND

1. Field

The disclosure relates to a method and device for saving energy in a wireless communication system.

2. Description of Related Art $5^{th}$ generation (5G) mobile communication technologies define broad frequency bands such that high transmission rates and new services are possible, and can be implemented not only in "Sub 6 gigahertz (GHz)" bands such as 3.5 GHz, but also in "Above 6 GHz" bands referred to as millimeter wave (mmWave) including 28 GHz and 39 GHz. In addition, it has been considered to implement 6th generation (6G) mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broad-bands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, new radio (NR) user equipment (UE)

Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and device for reducing energy consumption of a base station in a wireless communication system.

Another aspect of the disclosure is to determine transmission of a synchronization signal block (SSB) and reception of the SSB by a user equipment (UE) through dynamic signaling.

Additional aspects will be set forth in part in the description which follows and, in part, will be apparent from the description, or may be learned by practice of the presented embodiments.

In accordance with an aspect of the disclosure, a method performed by a user equipment (UE) in a wireless communication system is provided. The method includes receiving, from a base station, first configuration information about a synchronization signal block (SSB), receiving, from the base station, second configuration information about the SSB, the second configuration information including information indicating whether to cancel SSB transmission, and determining whether to receive the SSB based on the first configuration information and the second configuration information.

In accordance with another aspect of the disclosure, a UE in a wireless communication system is provided. The UE includes a transceiver and a processor configured to receive, through the transceiver from a base station, first configuration information about a synchronization signal block (SSB), receive, through the transceiver from a base station, second configuration information about the SSB, the second configuration information including information indicating whether to cancel SSB transmission, and determine whether to receive the SSB based on the first configuration information and the second configuration information.

In accordance with another aspect of the disclosure, a method performed by a base station in a wireless communication system is provided. The method includes transmitting first configuration information about a synchronization signal block (SSB), transmitting second configuration information about the SSB including information indicating whether to cancel SSB transmission, and determining whether to transmit the SSB based on the first configuration information and the second configuration information.

In accordance with another aspect of the disclosure, a base station in a wireless communication system is provided. The base station includes a transceiver and a processor configured to transmit, through the transceiver, first configuration information about a synchronization signal block (SSB), transmit, through the transceiver, second configuration information about the SSB, the second configuration information including information indicating whether to cancel SSB transmission, and determine whether to transmit the SSB based on the first configuration information and the second configuration information.

In accordance with another aspect of the disclosure, a method for controlling SSB transmission through dynamic signaling to reduce energy consumption of a base station by a UE in a wireless communication system is provided. The method includes receiving information related to different SSB configurations through higher layer signaling, allocating a resource through SSB information configured through higher layer signaling, receiving dynamic L1 signaling to omit configured SSB reception, and receiving an SSB based on the configuration information.

In accordance with another aspect of the disclosure, a method for controlling SSB transmission through dynamic signaling to reduce energy consumption by a base station in a wireless communication system is provided. The method includes transmitting information related to different SSB configurations through higher layer signaling, allocating a resource through SSB information configured through higher layer signaling, transmitting dynamic L1 signaling to omit configured SSB reception, and transmitting an SSB based on the configuration information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 12 is a flowchart of a terminal for reconfiguring SSB transmission through dynamic signaling of a 5G system according to an embodiment of the disclosure;

The same reference numerals are used to represent the same elements throughout the drawings.

DETAILED DESCRIPTION

Figure 1:
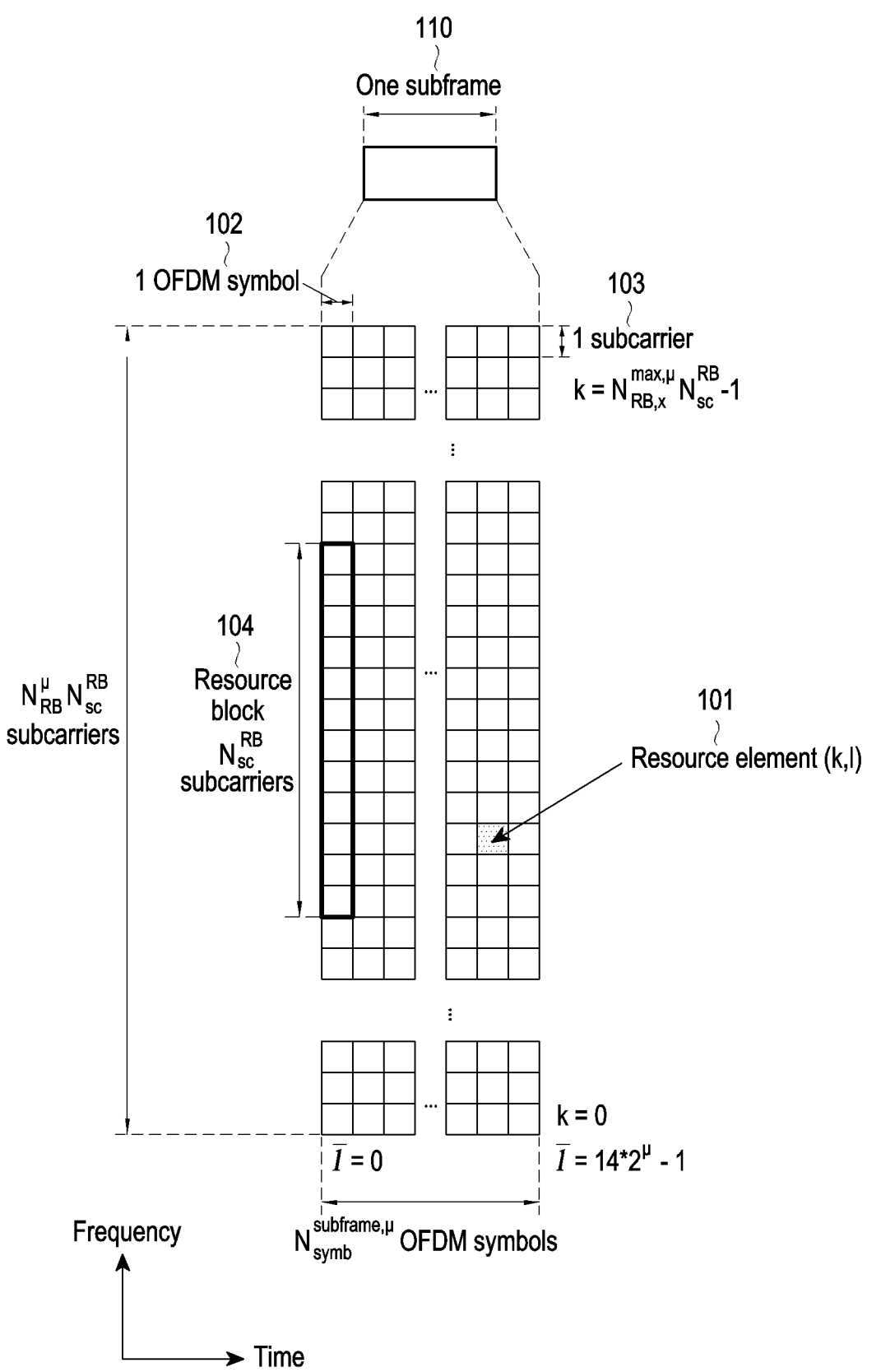
FIG. 1 is a view illustrating a basic structure of a time-frequency domain, which is a radio resource domain, in a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reasons, some elements may be exaggerated or schematically shown. The size of each element does not necessarily reflect the real size of the element. The same reference numeral is used to refer to the same element throughout the drawings.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the category of the disclosure. The disclosure is defined only by the appended claims. The same reference numeral denotes the same element throughout the specification. When determined to make the subject matter of the disclosure unclear, the detailed description of the known art or functions may be skipped. The terms as used herein are defined considering the functions in the disclosure and may be replaced with other terms according to the intention or practice of the user or operator. Therefore, the terms should be defined based on the overall disclosure.

Hereinafter, the base station may be an entity allocating resource to terminal and may be at least one of gNode B, eNode B, Node B, base station (BS), wireless access unit, base station controller, or node over network. The terminal may include a user equipment (UE), mobile station (MS), cellular phone, smartphone, computer, or multimedia system capable of performing communication functions. In the disclosure, downlink (DL) refers to a wireless transmission path of signal transmitted from the base station to the terminal, and uplink (UL) refers to a wireless transmission path of signal transmitted from the terminal to the base station. Although long term evolution (LTE) or LTE-advanced (LTE-A) systems may be described below as an example, the embodiments may be applied to other communication systems having a similar technical background or channel pattern. For example, 5G mobile communication technology (5G, new radio, NR) developed after LTE-A may be included therein, and 5G below may be a concept including legacy LTE, LTE-A and other similar services. Further, the embodiments may be modified in such a range as not to significantly depart from the scope of the disclosure under the determination by one of ordinary skill in the art and such modifications may be applicable to other communication systems.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement embodiments, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, a 'unit' is not limited to software or hardware. A 'unit' may be configured in a storage medium that may be addressed or may be configured to execute one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. Functions provided within the components and the 'units' may be combined into smaller numbers of components and 'units' or further separated into additional components and 'units'. Further, the components and 'units' may be implemented to execute one or more central processing units (CPUs) in a device or secure multimedia card. According to embodiments, a " . . . unit" may include one or more processors.

Hereinafter, embodiments of the disclosure are described in detail with reference to the accompanying drawings. Hereinafter, for methods and devices proposed in embodiments of the disclosure, embodiments of the disclosure are described as an example for enhancing uplink coverage when performing a random access procedure. However, without limitations to each embodiment, all or some of one or more embodiments proposed herein may be combined to be used for a method for configuring frequency resources corresponding to other channels. Further, embodiments of the disclosure may be modified in such a range as not to significantly depart from the scope of the disclosure under the determination by one of ordinary skill in the art and such modifications may be applicable.

When determined to make the subject matter of the disclosure unclear, the detailed description of the known art or functions may be skipped. The terms as used herein are defined considering the functions in the disclosure and may be replaced with other terms according to the intention or practice of the user or operator. Therefore, the terms should be defined based on the overall disclosure.

Wireless communication systems evolve beyond voice-centered services to broadband wireless communication systems to provide high data rate and high-quality packet data services, such as 3rd generation partnership project (3GPP) high speed packet access (HSPA), long term evolution (LTE) or evolved universal terrestrial radio access (E-UTRA)), LTE-advanced (LTE-A), LTE-pro, 3GPP2 high rate packet data (HRPD), ultra mobile broadband (UMB), and institute of electrical and electronics engineers (IEEE) 802.17e communication standards.

As a representative example of such broadband wireless communication system, the LTE system adopts orthogonal frequency division multiplexing (OFDM) for downlink and single carrier frequency division multiple access (SC-FDMA) for uplink. The uplink may refer to a radio link in which the terminal (hereinafter, referred to as user equipment (UE)) transmits data or control signals to the base station (evolved node B (eNode B) or base station (BS)), and the downlink refers to a radio link through which the base station transmits data or control signals to the UE. Such multiple access scheme allocates and operates time-frequency resources carrying data or control information per user not to overlap, i.e., to maintain orthogonality, to thereby differentiate each user's data or control information.

Post-LTE communication systems, e.g., 5G communication systems, are required to simultaneously support various requirements to freely reflect various requirements from users and service providers. Services considered for 5G communication systems include, e.g., enhanced mobile broadband (eMBB), massive machine type communication (MMTC), or ultra reliability low latency communication (URLLC).

eMBB aims to provide a further enhanced data transmission rate as compared with LTE, LTE-A, or LTE-pro. For example, eMBB for 5G communication systems needs to provide a peak data rate of 20 Gbps on download and a peak data rate of 10 Gbps on uplink in terms of one base station. 5G communication systems also need to provide an increased user perceived data rate while simultaneously providing such peak data rate. To meet such requirements, various transmit (TX)/receive (RX) techniques, as well as multiple input multiple output (MIMO), may need to further be enhanced. While LTE adopts a TX bandwidth up to 20 MHz in the 2 GHz band to transmit signals, the 5G communication system employs a broader frequency bandwidth in a frequency band ranging from 3 GHz to 6 GHz or more than 6 GHz to meet the data rate required for 5G communication systems.

Further, mMTC is also considered to support application services, such as internet of things (IoT) in the 5G communication system. To efficiently provide IoT, mMTC is required to support massive UEs in the cell, enhance the coverage of the UE and the battery time, and reduce UE costs. IoT terminals are attached to various sensors or devices to provide communication functionality, and thus, it needs to support a number of UEs in each cell (e.g., 1,000,000 UEs/km$^2$). Since mMTC-supportive UEs, by the nature of service, are highly likely to be located in shadow areas not covered by the cell, such as the underground of a building, it requires much broader coverage as compared with other services that the 5G communication system provides. mMTC-supportive UEs, due to the need for being low cost and difficulty in frequently exchanging batteries, are required to have a very long battery life, e.g., 10 years to 16 years.

URLLC is a mission-critical, cellular-based wireless communication service. For example, there may be considered a service for use in remote control for robots or machinery, industrial automation, unmanned aerial vehicles, remote health care, or emergency alert. This requires that URLLC provide very low-latency and very high-reliability communication. For example, URLLC-supportive services need to meet an air interface latency of less than 0.5 milliseconds simultaneously with a packet error rate of $10^{-5}$ or less. Thus, for URLLC-supportive services, the 5G communication system is required to provide a shorter transmit time interval (TTI) than those for other services while securing reliable communication links by allocating a broad resource in the frequency band.

The three services of the 5G communication system (hereinafter interchangeable with the 5G system), i.e., eMBB, URLLC, and mMTC, may be multiplexed and transmitted in one system. The services may adopt different transmit/receive (TX/RX) schemes and TX/RX parameters to meet their different requirements.

The frame structure of the 5G system is described below in more detail with reference to the drawings. Hereinafter, as wireless communication systems to which the disclosure is applied, 5G systems are described as an example for convenience of description. However, embodiments of the disclosure may also be applied to post-5G systems or other communication systems in the same or similar manner.

FIG. 1 is a view illustrating a basic structure of a time-frequency domain, which is a radio resource domain, in a wireless communication system according to an embodiment of the disclosure.

Referring to FIG. 1, the horizontal axis represents the time domain, and the vertical axis represents the frequency domain. A basic unit of a resource in the time and frequency domain is a resource element (RE) 101, which may be defined as one orthogonal frequency division multiplexing (OFDM) symbol (or discrete Fourier transform spread OFDM (DFT-s-OFDM) symbol) 102 on the time axis, and as one subcarrier 103 on the frequency axis.

$$N_{sc}^{RB}$$

(e.g., 12) consecutive REs, which represent the number of subcarriers per resource block (RB) in the frequency domain, may constitute resource block (RB) 104.

$$N_{symb}^{subframe}$$

consecutive OFDM symbols, which represent the number of symbols per subframe in the time domain, may constitute one subframe 110.

Figure 2:
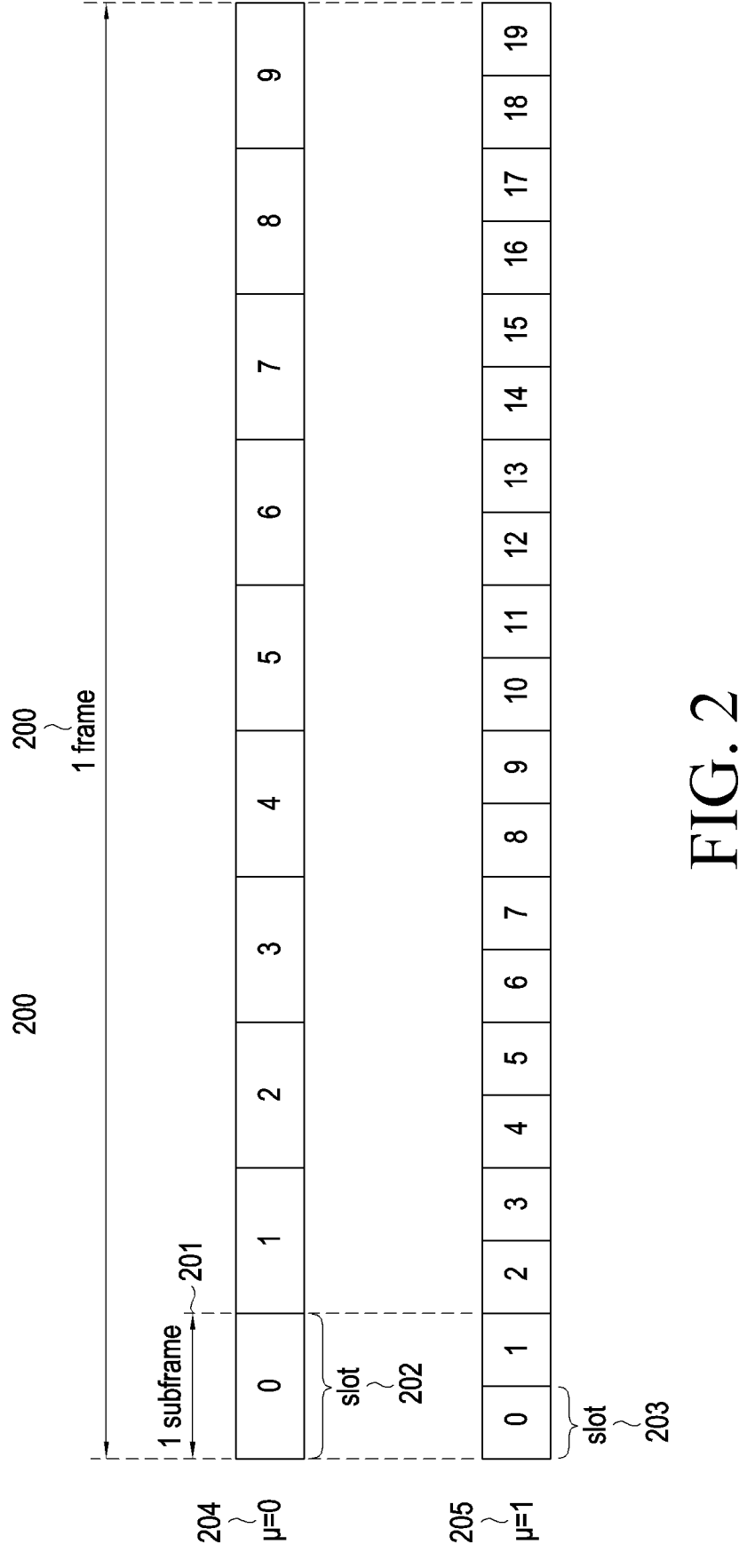
FIG. 2 is a view illustrating a slot structure considered in a wireless communication system according to an embodiment of the disclosure.

FIG. 2 is a view illustrating a slot structure considered in a wireless communication system according to an embodiment of the disclosure.

FIG. 2 illustrates an example structure including a frame 200, a subframe 201, and a slot 202 or 203. One frame 200 may be defined as 10 ms. One subframe 201 may be defined as 1 ms, and thus, one frame 200 may consist of a total of 10 subframes 201. One slot 202 or 203 may be defined as 14 OFDM symbols (that is, the number $$\left( N_{symb}^{slot} \right)$$

of symbols per slot=14). One subframe 201 may be composed of one or more slots 202 or 203, and the number of slots 202 and 203 per subframe 201 may differ depending on μ (204 or 205), which is a set value for the subcarrier space (SCS).

A slot structure of μ=0 (204) and a slot structure of μ=1 (205) are shown as the set subcarrier spacing values. When μ=0 (204), one subframe 201 may be constituted of one slot 202. When μ=1 (205), one subframe 201 may be constituted of two slots (e.g., including the slot 203). In other words, according to the set subcarrier spacing value μ, the number $$\left( N_{slot}^{subframe,\mu} \right)$$

of slots per subframe may vary, and accordingly, the number $$\left( N_{slot}^{frame,\mu} \right)$$

of slots per frame may differ. For example, according to each subcarrier spacing μ, $$N_{slot}^{subframe,\mu}$$

and $$N_{slot}^{frame,\mu}$$

may be defined in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |

TABLE 1-continued

| μ | $N_{symb}^{slot}$ | $N_{slot}^{frame,\mu}$ | $N_{slot}^{subframe,\mu}$ |
|---|---|---|---|
| 4 | 14 | 160 | 16 |
| 5 | 14 | 320 | 32 |
| 6 | 14 | 640 | 64 |

In the 5G wireless communication system, a synchronization signal block (which may be interchangeably used with SSB, SS block, or SS/PBCH block) may be transmitted for initial access of the UE. The synchronization signal block may include a primary synchronization signal (PSS), a secondary synchronization signal (SSS), and a physical broadcast channel (PBCH).

In the initial access phase in which the UE accesses the system, the UE may obtain downlink time and frequency domain synchronization from a synchronization signal through a cell search and performs the cell ID. The synchronization signal may include a PSS and an SSS. The UE may receive the PBCH, transmitting a master information block (MIB), from the base station, obtaining system information related to transmission and reception, such as system bandwidth or related control information, and basic parameter values. Based on the information, the UE may perform decoding on a physical downlink control channel (PDCCH) and a physical downlink shared channel (PDSCH), obtaining the system information block (SIB). Thereafter, the UE may exchange identification-related information for the base station and the UE through a random access step and undergoes registration and authentication to thus initially access the network. Further, the UE may receive system information (system information block (SIB)) transmitted by the base station to obtain cell-common transmission/reception-related control information. The cell-common transmission/reception-related control information may include random access-related control information, paging-related control information, and common control information about various physical channels.

A synchronization signal is a signal that is a reference signal for cell search, and subcarrier spacing may be applied for each frequency band to suit the channel environment, such as phase noise. In the case of a data channel or a control channel, different subcarrier spacings may be applied depending on service types to support various services as described above.

Figure 3:
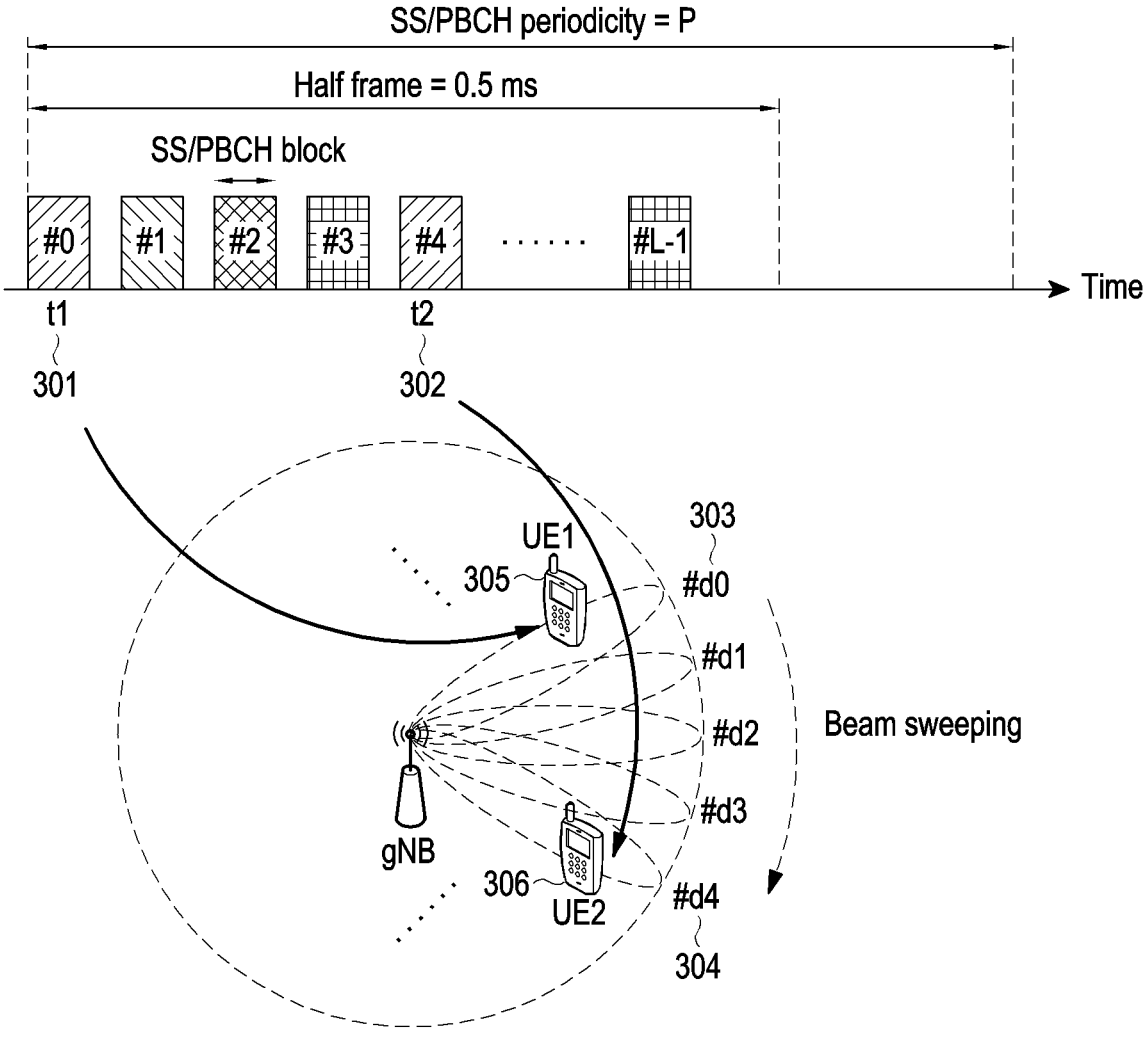
FIG. 3 is a view illustrating an example of a time-domain mapping structure of a synchronization signal and a beam sweeping operation according to an embodiment of the disclosure.

FIG. 3 is a view illustrating an example of a time-domain mapping structure of a synchronization signal and a beam sweeping operation according to an embodiment of the disclosure.

For purposes of illustration, the following components may be defined:

Primary synchronization signal (PSS): A signal that serves as a reference for DL time/frequency synchronization and provides part of the information for cell ID Secondary synchronization signal (SSS): serves as a reference for DL time/frequency synchronization and provides remaining partial cell ID information. Additionally, it may serve as a reference signal for demodulation of PBCH.

Physical broadcast channel (PBCH): provides a master information block (MIB), which is essential system information required data channel and control channel transmission/reception by the UE. The essential system information may include search space-related control information indicating radio resource mapping information about a control channel, scheduling control information for a separate data channel for transmitting system information, and information, such as system frame number (SFN), which is the frame unit index serving as a timing reference.

Synchronization signal/PBCH block or SSB (SS/PBCH block): The SS/PBCH block is constituted of N OFDM symbols and is composed of a combination of the PSS, SSS, and PBCH. In the case of a system to which beam sweeping technology is applied, the SS/PBCH block is the minimum unit to which beam sweeping is applied. In the 5G system, N=4. The base station may transmit up to L SS/PBCH blocks. The L SS/PBCH blocks are mapped within a half frame (0.5 ms). The L SS/PBCH blocks are periodically repeated every predetermined period P. The base station may inform the UE of the period P. If there is no separate signaling for the period P, the UE applies a previously agreed default value.

FIG. 3 illustrates an example in which beam sweeping applies every SS/PBCH block.

Referring to FIG. 3, UE1 305 receives the SS/PBCH block using the beam radiated in direction #d0 303 by the beamforming applied to SS/PBCH block #0 at time t1 301. UE2 306 receives the SS/PBCH block using the beam radiated in direction #d4 304 by the beamforming applied to SS/PBCH block #4, at time t2 302. The UE may obtain an optimal synchronization signal through the beam radiated from the base station in the direction where the UE is positioned. For example, it may be difficult for UE1 305 to obtain time/frequency synchronization and essential system information from the SS/PBCH block through the beam radiated in direction #d4 away from the position of UE1.

In addition to the initial access procedure, the UE may also receive the SS/PBCH block to determine whether the radio link quality of the current cell is maintained at a certain level or higher. Further, in a handover procedure in which the UE moves access from the current cell to the neighboring cell, the UE may determine the radio link quality of the neighboring cell and receive the SS/PBCH block of the neighboring cell to obtain time/frequency synchronization of the neighboring cell.

A cell initial access procedure of a 5G wireless communication system is described below in more detail with reference to the drawings.

The synchronization signal is a signal serving as a reference for cell search and may be transmitted, with a subcarrier spacing appropriate for the channel environment (e.g., including phase noise) for each frequency band applied thereto. The 5G base station may transmit a plurality of synchronization signal blocks according to the number of analog beams to be operated. For example, a PSS and an SSS may be mapped over 12 RBs and transmitted, and a PBCH may be mapped over 24 RBs and transmitted. Described below is a structure in which a synchronization signal and a PBCH are transmitted in a 5G communication system.

Figure 4:
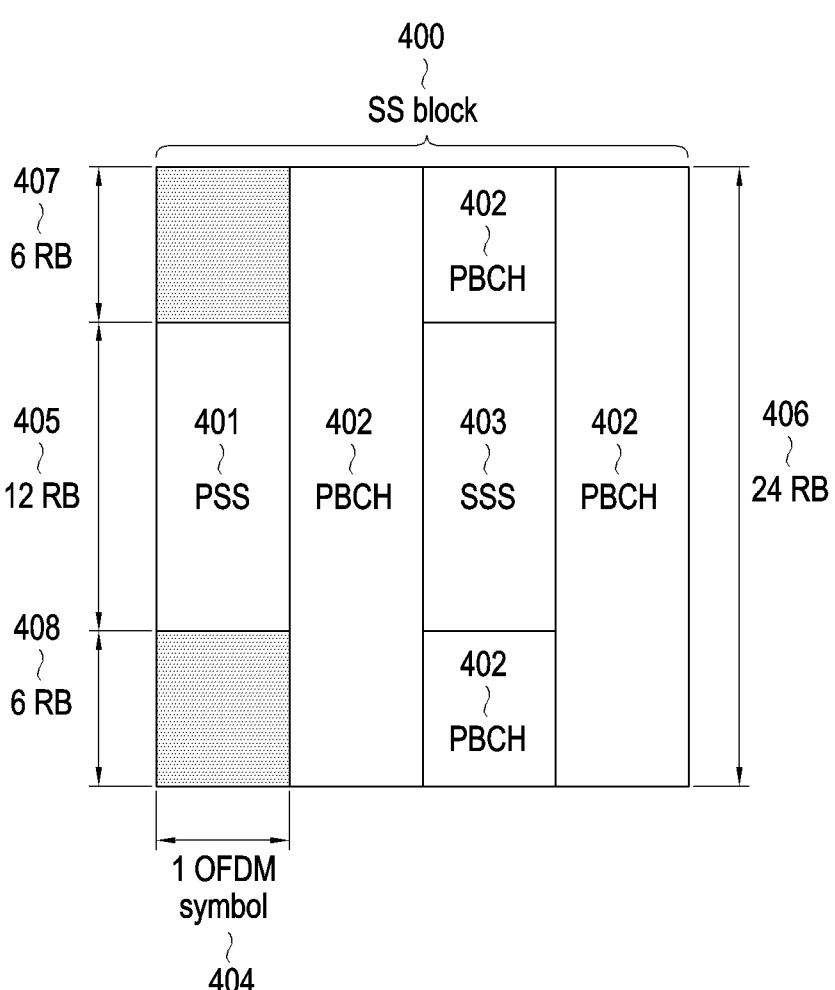
FIG. 4 is a view illustrating a synchronization signal block considered in a wireless communication system according to an embodiment of the disclosure.

FIG. 4 is a view illustrating a synchronization signal block considered in a wireless communication system according to an embodiment of the disclosure.

Referring to FIG. 4, a synchronization signal block (SS block) 400 may include a PSS 401, an SSS 403, and broadcast channels (PBCH) 402.

The synchronization signal block 400 may be mapped to four OFDM symbols 404 on the time axis. The PSS 401 and the SSS 403 may be transmitted in 12 RBs 405 on the frequency axis and in first and third OFDM symbols on the time axis, respectively. In the 5G system, e.g., a total of 1008 different cell IDs may be defined. The PSS 401 may have three different values according to the physical cell ID (PCI) of the cell, and the SSS 403 may have 336 different values. The UE may obtain one of (336×3=)1,008 cell IDs, as a combination, by detection on the PSS 401 and the SSS 403. This may be represented as Equation 1.

$$N_{ID}^{cell} = 3N_{ID}^{(1)} + N_{ID}^{(2)}$$ Equation (1)

where $$N_{ID}^{(1)}$$

may be estimated from the SSS 403 and have a value between 0 and 335.

$$N_{ID}^{(2)}$$

may be estimated from the PSS 401 and have a value between 0 and 2. The UE may estimate $$N_{ID}^{(cell)}$$

which is the cell ID, by a combination of $$N_{ID}^{(1)}$$

and $$N_{ID}^{(2)}$$

The PBCH 402 may be transmitted in the resource including 24 RBs 406 on the frequency axis and 6RBs 407 and 408 on both sides of each of the second and fourth OFDM symbols, except for the intermediate 12 RBs 405 where the SSS 403 is transmitted, on the time axis. The PBCH 402 may include a PBCH payload and a PBCH demodulation reference signal (DMRS). In the PBCH payload, various system information called MIB may be transmitted. For example, the MIB may include information as shown in Table 2 below.

TABLE 2

| MIB ::= | SEQUENCE { |
|---|---|
| systemFrameNumber | BIT STRING (SIZE (6)), |
| subCarrierSpacingCommon | ENUMERATED {scs15or60, scs30or120}, |
| ssb-SubcarrierOffset | INTEGER (0..15), |
| dmrs-TypeA-Position | ENUMERATED {pos2, pos3}, |
| pdcch-ConfigSIB1 | PDCCH-ConfigSIB1, |
| cellBarred | ENUMERATED {barred, notBarred}, |
| intraFreqReselection | ENUMERATED {allowed, notAllowed}, |
| spare | BIT STRING (SIZE (1)) |
| } | |

Synchronization signal block information: The offset in the frequency domain of the synchronization signal block may be indicated through the four-bit ssb-Sub-carrierOffset in the MIB. The index of the synchronization signal block including the PBCH may be indirectly obtained through decoding of the PBCH DMRS and PBCH. In an embodiment, in a frequency band below 6 GHz, 3 bits obtained through decoding of the PBCH DMRS indicate the synchronization signal block index and, in a frequency band above 6 GHz, 6 bits in total, including 3 bits obtained through decoding of the PBCH DMRS and 3 bits included in the PBCH payload and obtained by PBCH decoding may indicate the synchronization signal block index including the PBCH.

Physical downlink control channel (PDCCH) configuration information: —the subcarrier spacing of the common downlink control channel may be indicated through 1 bit (subCarrierSpacingCommon) in the MIB, and the time-frequency resource configuration information of the search space (SS) and the control resource set (CORESET) may be indicated through 8 bits (pdcch-ConfigSIB1).

System frame number (SFN): 6 bits (systemFrameNumber) in the MIB may be used to indicate a part of the SFN. The 4 least significant bits (LSBs) of the SFN are included in the PBCH payload, and the UE may indirectly obtain it through PBCH decoding.

Timing information in the radio frame: 1 bit (half frame) obtained through PBCH decoding and included in the PBCH payload and the synchronization signal block index described above. The UE may indirectly identify whether the synchronization signal block is transmitted in the first or second half frame of the radio frame.

Since the transmission bandwidth (12 RBs 405) of the PSS 401 and the SSS 403 and the transmission bandwidth (24 RBs 406) of the PBCH 402 are different from each other, the first OFDM symbol where the PSS 401 is transmitted in the PBCH (402) transmission bandwidth has 6 RBs 407 and 408 on both sides except the intermediate 12 RBs where the PSS 401 is transmitted, and the region may be used to transmit other signals or may be empty.

The synchronization signal blocks may be transmitted using the same analog beam. For example, the PSS 401, the SSS 403, and the PBCH 402 may all be transmitted through the same beam. Since the analog beam, by its nature, cannot be applied differently on the frequency axis, the same analog beam may be applied to all the RBs on the frequency axis RBs within a specific OFDM symbol to which a specific analog beam is applied. For example, all of the four OFDM symbols in which the PSS 401, the SSS 403, and the PBCH 402 are transmitted may be transmitted using the same analog beam.

Figure 5:
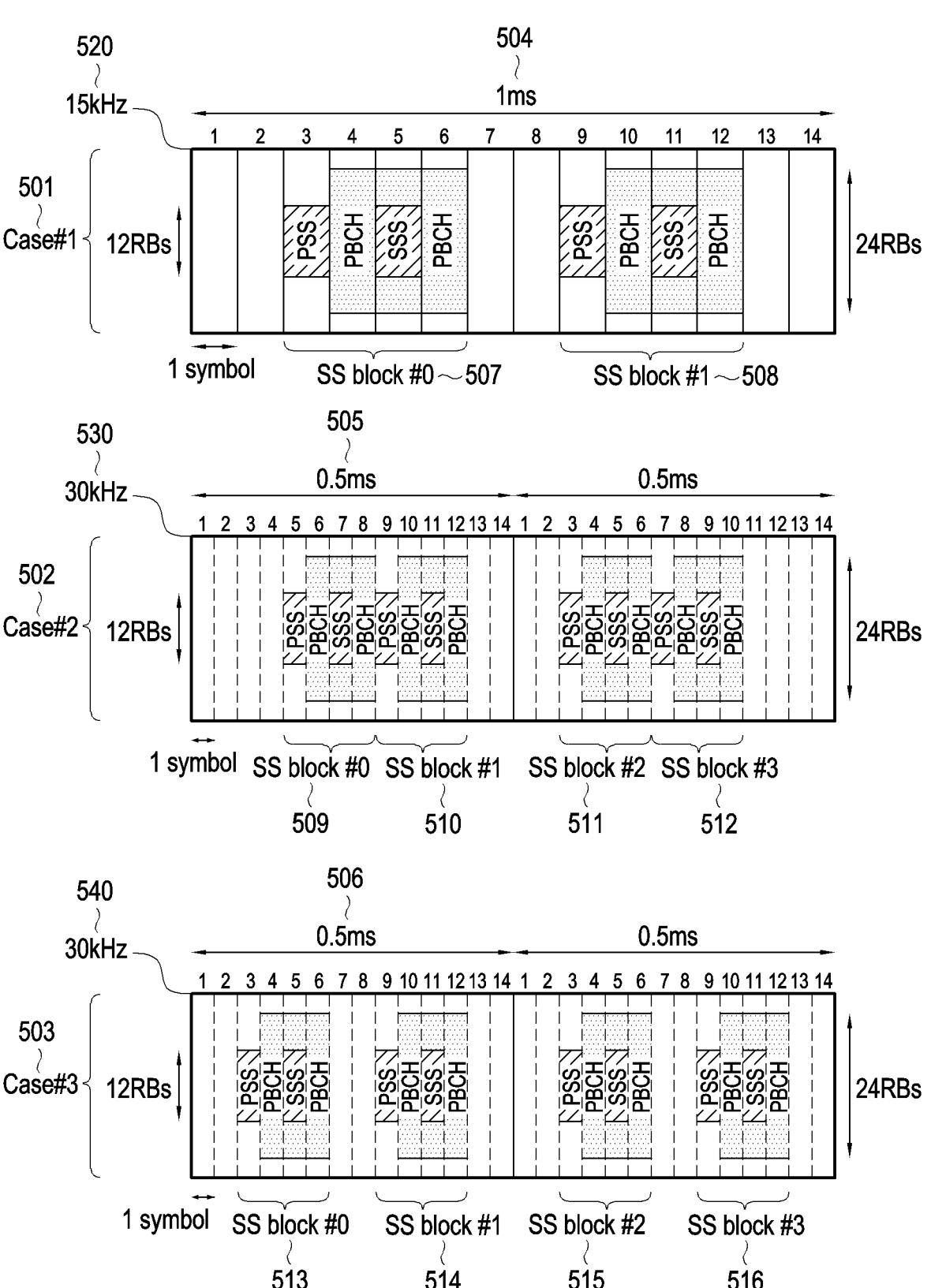
FIG. 5 is a view illustrating transmission cases of a synchronization signal block in a frequency band of less than 6 GHz considered in a communication system according to an embodiment of the disclosure.

FIG. 5 is a view illustrating transmission cases of a synchronization signal block in a frequency band of less than 6 GHz considered in a communication system according to an embodiment of the disclosure.

Referring to FIG. 5, in the 5G communication system, in a frequency band below 6 GHz, a subcarrier spacing (SCS) 520 of 15 kHz and a subcarrier spacing of 30 kHz (530 or 440) may be used for synchronization signal block transmission. In the 15 kHz subcarrier spacing 520, there is one transmission case (e.g., Case #1 (501)) for the synchronization signal block and, in the 30 kHz subcarrier spacing 530 or 540, there may be two transmission cases for the synchronization signal block (e.g., Case #2 (402) and Case #3 503).

Referring to FIG. 5, in case #1 (501) of the 15 kHz subcarrier spacing (520), up to two synchronization signal blocks may be transmitted within 1 ms (504) (or, when 1 slot consists of 14 OFDM symbols, it corresponds to a length of 1 slot). In the example of FIG. 4, synchronization signal block #0 507 and synchronization signal block #1 508 are shown. For example, the synchronization signal block #0 507 may be mapped to four consecutive symbols from the third OFDM symbol, and the synchronization signal block #1 508 may be mapped to four consecutive symbols from the ninth OFDM symbol.

Different analog beams may be applied to the synchronization signal block #0 507 and the synchronization signal block #1 508. The same beam may be applied to all of the 3rd to 6th OFDM symbols to which synchronization signal block #0 507 is mapped, and the same beam may be applied to all of the 9th to 12th OFDM symbols to which synchronization signal block #1 508 is mapped. In the 7th, 8th, 13th, and 14th OFDM symbols to which no synchronization signal block is mapped, an analog beam to be used may be freely determined under the determination of the base station.

Referring to FIG. 5, in case #2 (502) of the 30 kHz subcarrier spacing (530), up to two synchronization signal blocks may be transmitted within 0.5 ms (505) (or, when 1 slot consists of 14 OFDM symbols, it corresponds to a length of 1 slot), and accordingly, up to four synchronization signal blocks may be transmitted within 1 ms (or, if 1 slot consists of 14 OFDM symbols, it corresponds to a length of 2 slots). FIG. 4 illustrates an example in which synchronization signal block #0 509, synchronization signal block #1 510, synchronization signal block #2 511, and synchronization signal block #3 512 are transmitted within 1 ms (i.e., two slots). Synchronization signal block #0 509 and synchronization signal block #1 510 may be mapped from the fifth OFDM symbol and the ninth OFDM symbol, respectively, of the first slot. Synchronization signal block #2 511 and synchronization signal block #3 512 may be mapped from the third OFDM symbol and the seventh OFDM symbol, respectively, of the second slot.

Different analog beams may be applied to synchronization signal block #0 509, synchronization signal block #1 510, synchronization signal block #2 511, and synchronization signal block #3 512. The same analog beam may be applied to the 5th to 8th OFDM symbols of the first slot in which synchronization signal block #0 509 is transmitted, the 9th to 12th OFDM symbols of the first slot in which synchronization signal block #1 510 is transmitted, the 3rd to 6th symbols of the second slot in which synchronization signal block #2 511 is transmitted, and the 7th to 10th symbols of the second slot in which synchronization signal block #3 512 is transmitted. In the OFDM symbols to which no synchronization signal block is mapped, an analog beam to be used may be freely determined under the determination of the base station.

Referring to FIG. 5, in case #3 (503) of the 30 kHz subcarrier spacing (540), up to two synchronization signal blocks may be transmitted within 0.5 ms (506) (or, when 1 slot consists of 14 OFDM symbols, it corresponds to a length of 1 slot), and accordingly, up to four synchronization signal blocks may be transmitted within 1 ms (or, if 1 slot consists of 14 OFDM symbols, it corresponds to a length of 2 slots). FIG. 4 illustrates an example in which synchronization signal block #0 513, synchronization signal block #1 514, synchronization signal block #2 515, and synchronization signal block #3 516 are transmitted within 1 ms (i.e., two slots). Synchronization signal block #0 513 and synchronization signal block #1 514 may be mapped from the 3rd OFDM symbol and the 9th OFDM symbol, respectively, of the first slot, and synchronization signal block #2 515 and synchronization signal block #3 516 may be mapped from the 3rd OFDM symbol and the 9th OFDM symbol, respectively, of the second slot.

Different analog beams may be used for synchronization signal block #0 513, synchronization signal block #1 514, synchronization signal block #2 515, and synchronization signal block #3 516. As described above in connection with examples, the same analog beam may be used in all four OFDM symbols in which each synchronization signal block is transmitted, and which beam is used in OFDM symbols to which no synchronization signal block is mapped may be freely determined by the base station.

Figure 6:
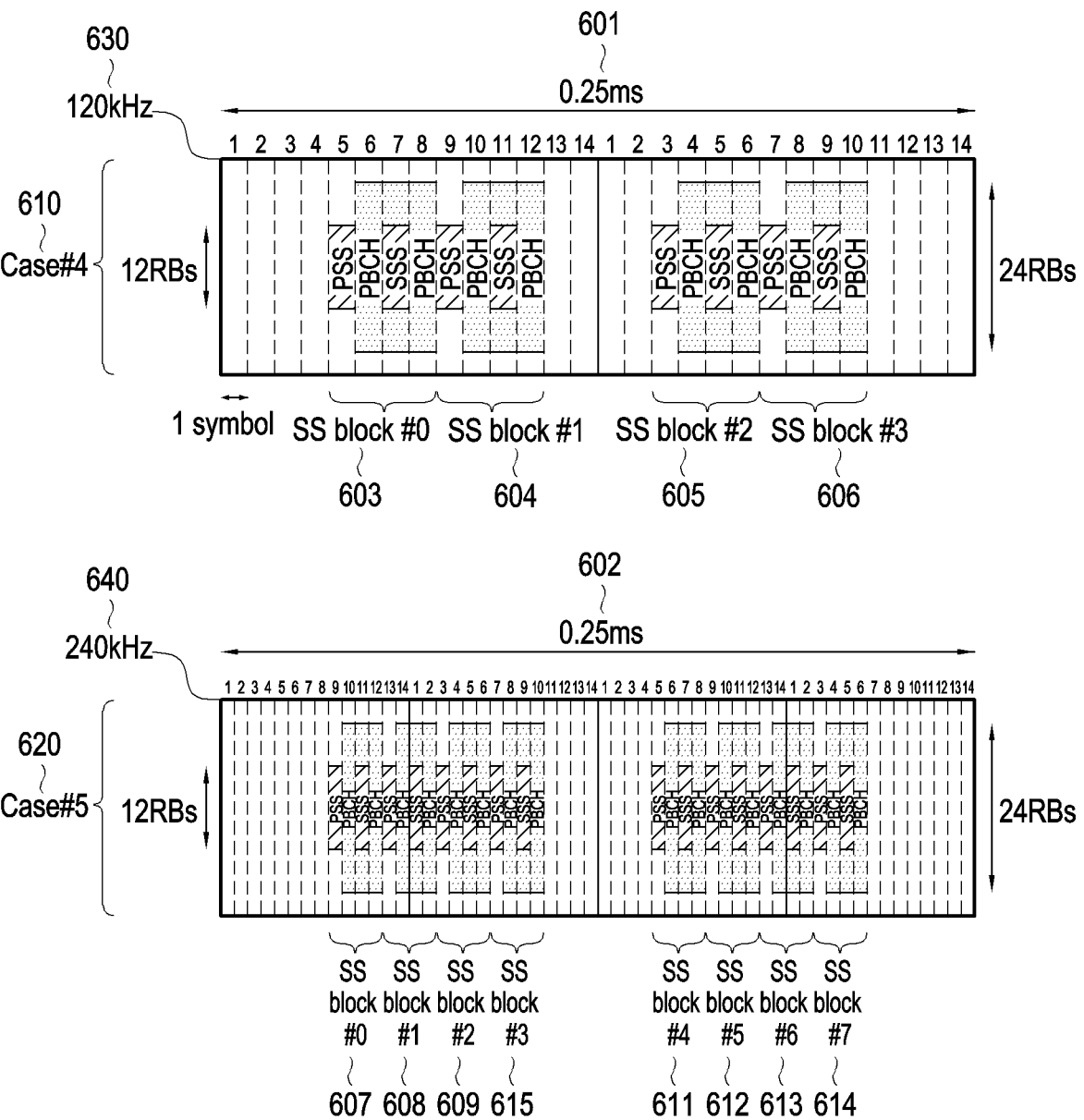
FIG. 6 is a view illustrating transmission cases of a synchronization signal block in a frequency band of 6 GHz or higher considered in a wireless communication system according to an embodiment of the disclosure.

FIG. 6 is a view illustrating transmission cases of a synchronization signal block in a frequency band of 6 GHz or higher considered in a wireless communication system according to an embodiment of the disclosure.

In the 5G communication system, in a frequency band of 6 GHz or higher, the sub-carrier spacing of 120 kHz (630) as in the example of case #4 (610) and the sub-carrier spacing of 240 kHz (640) as in the example of case #5 (620) may be used for synchronization signal block transmission.

Referring to FIG. 6, in case #4 (610) of the 120 kHz subcarrier spacing (630), up to four synchronization signal blocks may be transmitted within 0.25 ms (601) (or, when 1 slot consists of 14 OFDM symbols, it corresponds to a length of 2 slots). FIG. 6 illustrates an example in which synchronization signal block #0 603, synchronization signal block #1 604, synchronization signal block #2 605, and synchronization signal block #3 606 are transmitted within 0.25 ms (i.e., two slots). Synchronization signal block #0 603 and synchronization signal block #1 604 may be mapped to four consecutive symbols from the 5th OFDM symbol and to four consecutive symbols from the 9th OFDM symbol, respectively, of the first slot, and synchronization signal block #2 605 and synchronization signal block #3 606 may be mapped to four consecutive symbols from the 3rd OFDM symbol and to four consecutive symbols from the 7th OFDM symbol, respectively, of the second slot.

As described above in connection with the above embodiments, different analog beams may be used for synchronization signal block #0 603, synchronization signal block #1 604, synchronization signal block #2 605, and synchronization signal block #3 606. The same analog beam may be used in all four OFDM symbols in which each synchronization signal block is transmitted, and which beam is used in OFDM symbols to which no synchronization signal block is mapped may be freely determined by the base station.

In case #1 (620) of the 240 kHz subcarrier spacing (640), up to eight synchronization signal blocks may be transmitted within 0.25 ms (602) (or, when 1 slot consists of 14 OFDM symbols, it corresponds to a length of 4 slots). FIG. 6 illustrates an example in which synchronization signal block #0 (607), synchronization signal block #1 (608), synchronization signal block #2 (609), synchronization signal block #3 (615), synchronization signal block #4 (611), synchronization signal block #5 (612), synchronization signal block #6 (613), and synchronization signal block #7 (614) are transmitted within 0.25 ms (i.e., 4 slots).

Synchronization signal block #0 (607) and synchronization signal block #1 (608) may be mapped to four consecutive symbols from the 9th OFDM symbol and to four consecutive symbols from the 13th OFDM symbol, respectively, of the first slot, synchronization signal block #2 (609) and synchronization signal block #3 (615) may be mapped to four consecutive symbols from the 3rd OFDM symbol and to four consecutive symbols from the 7th OFDM symbol, respectively, of the second slot, synchronization signal block #4 (611), synchronization signal block #5 612, and synchronization signal block #6 (613) may be mapped to four consecutive symbols from the 5th OFDM symbol, to four consecutive symbols from the 9th OFDM symbols, and to four consecutive symbols from the 13th OFDM symbol, respectively, of the third slot, and synchronization signal block #7 614 may be mapped to four consecutive symbols from the 3rd OFDM symbol of the fourth slot.

As described in connection with the above embodiment, synchronization signal block #0 (607), synchronization signal block #1 (608), synchronization signal block #2 (609), synchronization signal block #3 (615), synchronization signal block #4 (611), synchronization signal block #5 (612), synchronization signal block #6 (613), and synchronization signal block #7 (614) may use different analog beams. The same analog beam may be used in all four OFDM symbols in which each synchronization signal block is transmitted, and which beam is used in OFDM symbols to which no synchronization signal block is mapped may be freely determined by the base station.

Figure 7:
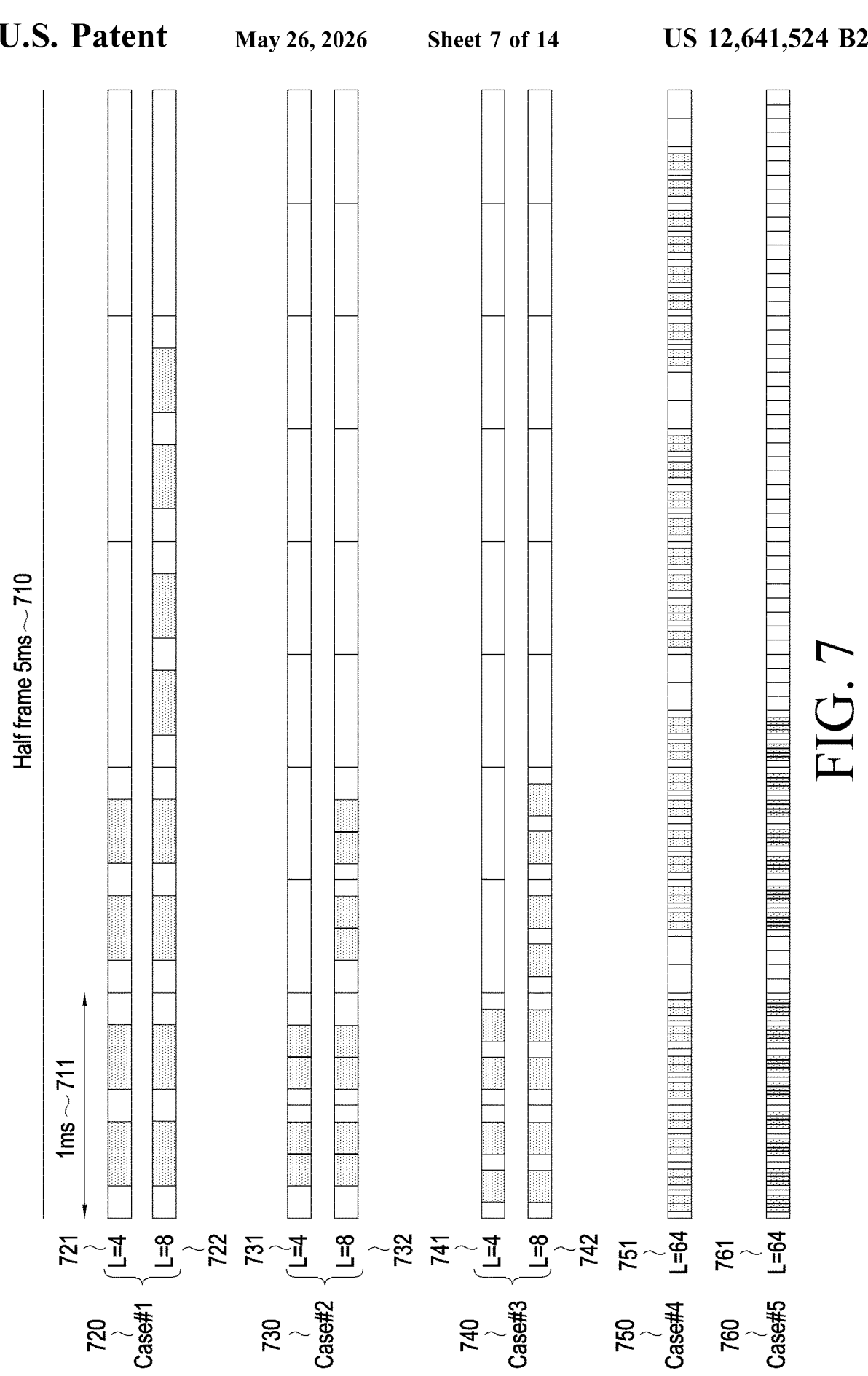
FIG. 7 is a view illustrating transmission cases of a synchronization signal block according to a subcarrier spacing within 5 ms in a wireless communication system according to an embodiment of the disclosure.

FIG. 7 is a view illustrating transmission cases of a synchronization signal block according to a subcarrier spacing within 5 ms in a wireless communication system according to an embodiment of the disclosure.

Referring to FIG. 7, in the 5G communication system, synchronization signal blocks may be transmitted periodically, e.g., every time interval 710 of 5 ms (corresponding to five subframes 711 or a half frame).

In a frequency band of 3 GHz or less, up to four synchronization signal blocks may be transmitted within 5 ms (710). Up to 8 synchronization signal blocks may be transmitted in a frequency band above 3 GHz and below 6 GHz. In a frequency band above 6 GHz, up to 64 synchronization signal blocks may be transmitted. As described above, the subcarrier spacings of 15 kHz and 30 kHz may be used at frequencies below 6 GHz.

In the example of FIG. 7, in case #1 (720) of the 15 kHz subcarrier spacing consisting of one slot of FIG. 7, in a frequency band of 3 GHz or less, synchronization signal blocks may be mapped to the first slot and the second slot so that up to four synchronization signal blocks 721 may be transmitted, and in a frequency band above 3 GHz and below 6 GHz, synchronization signal blocks may be mapped to the first, second, third, and fourth slots, so that up to eight synchronization signal blocks 722 may be transmitted. In case #2 (730) or case #3 (740) of the 30 kHz subcarrier spacing consisting of two slots in FIG. 5, in a frequency band below 3 GHz, synchronization signal blocks may be mapped starting from the first slot, so that up to four synchronization signal blocks 731 and 741 may be transmitted, and in a frequency band above 3 GHz and below 6 GHz, synchronization signal blocks may be mapped starting from the first and third slots, so that up to eight synchronization signal blocks 732 and 742 may be transmitted.

The subcarrier spacings of 120 kHz and 240 kHz may be used at frequencies above 6 GHz.

In the example of FIG. 7, in case #4 (750) of the 120 kHz subcarrier spacing consisting of two slots of FIG. 7, in a frequency band above 6 GHz, synchronization signal blocks may be mapped starting from 1st, 3rd, 5th, 7th, 11th, 13th, 15th, 17th, 21st, 23rd, 25th, 27th, 31st, 33rd, 35th, and 37th slots so that up to 64 synchronization signal blocks 751 may be transmitted. In the example of FIG. 7, in case #5 (760) of the 240 kHz subcarrier spacing consisting of 4 slots of FIG. 6, in a frequency band above 6 GHz, synchronization signal blocks may be mapped starting from the 1st, 5th, 9th, 13rd, 21st, 25th, 29th, and 33rd slots so that up to 64 synchronization signal blocks 761 may be transmitted.

The UE may obtain the SIB after decoding the PDCCH and the PDSCH based on the system information included in the received MIB. The SIB may include at least one of uplink cell bandwidth-related information, random access parameters, paging parameters, or parameters related to uplink power control.

In general, the UE may form a radio link with the network through a random access procedure based on the system information and synchronization with the network obtained in the cell search process of the cell. For random access, a contention-based or contention-free scheme may be used. When the UE performs cell selection and reselection in the phase of initial access to the cell, a contention-based random access scheme may be used for the purpose of, e.g., switching from the RRC_IDLE (RRC idle) state to the RRC_CO-NNECTED (RRC connected) state. Contention-free random access may be used when downlink data arrives, in the case of handover, or for re-establishing uplink synchronization for location measurement. Table 3 below illustrates conditions (events) under which a random access procedure is triggered in the 5G system.

TABLE 3

- Initial access from RRC_IDLE;
- RRC Connection Re-establishment procedure;
- DL or UL data arrival during RRC_CONNECTED when UL synchronisation
status is "non-synchronised";
- UL data arrival during RRC_CONNECTED when there are no PUCCH resources for SR available;
- SR failure;
- Request by RRC upon synchronous reconfiguration (e.g. handover);
- RRC Connection Resume procedure from RRC_INACTIVE;
- To establish time alignment for a secondary TAG;
- Request for Other SI;
- Beam failure recovery;
- Consistent UL LBT failure on SpCell.

Hereinafter, a method for setting a measurement time for radio resource management (RRM) based on a synchronization signal block (SS block or SSB) of a 5G wireless communication system is described.

The UE receives MeasObjectNR of MeasObjectToAdd-Modlist as configurations for SSB-based intra/inter-frequency measurements and CSI-RS-based intra/inter-frequency measurements through higher layer signaling. For example, MeasObjectNR may be configured as shown in Table 4 below.

TABLE 4

```
MeasObjectNR ::=                  SEQUENCE {
    ssbFrequency                                           ARFCN-ValueNR
OPTIONAL,   -- Cond SSBorAssociatedSSB
    ssbSubcarrierSpacing                                  SubcarrierSpacing
OPTIONAL,   -- Cond SSBorAssociatedSSB
    smtc1                                                      SSB-MTC
OPTIONAL,   -- Cond SSBorAssociatedSSB
    smtc2                                                     SSB-MTC2
OPTIONAL,   -- Cond IntraFreqConnected
    refFreqCSI-RS                                          ARFCN-ValueNR
OPTIONAL,   -- Cond CSI-RS
    referenceSignalConfig            ReferenceSignalConfig,
    absThreshSS-BlocksConsolidation                       ThresholdNR
OPTIONAL,   -- Need R
absThreshCSI-RS-Consolidation                             ThresholdNR
OPTIONAL,   -- Need R
    nrofSS-BlocksToAverage           INTEGER (2..maxNrofSS-BlocksTo Average)
OPTIONAL,   -- Need R
    nrofCSI-RS-ResourcesToAverage        INTEGER (2..maxNrofQuantityConfig),
ResourcesToAverage)            OPTIONAL,   -- Need R
    quantityConfigIndex              INTEGER (1..maxNrofQuantityConfig),
    offsetMO                         Q-OffsetRangeList,
    cellsToRemoveList                                          PCI-List
OPTIONAL,   -- Need N
    cellsToAddModList                                   CellsToAddModList
OPTIONAL,   -- Need N
    blackCellsToRemoveList                             PCI-RangeIndexList
OPTIONAL,   -- Need N
    blackCellsToAddModList           SEQUENCE (SIZE (1..maxNrofPCI-Ranges))
OF PCI-RangeElement     OPTIONAL,   -- Need N
    whiteCellsToRemoveList                             PCI-RangeIndexList
OPTIONAL,   -- Need N
    whiteCellsToAddModList           SEQUENCE (SIZE (1..maxNrofPCI-Ranges))
OF PCI-RangeElement     OPTIONAL,   -- Need N
    ...,
[[
    freqBandIndicatorNR                               FreqBandIndicatorNR
OPTIONAL,   -- Need R
    measCycleSCell                   ENUMERATED {sf160, sf256, sf320, sf512,
sf640, sf1024, sf1280}   OPTIONAL,   -- Need R
    ]],
[[
```

TABLE 4-continued

| smtc3list-r16 | SSB-MTC3List-r16 |
|---|---|
| OPTIONAL,  -- Need R | |
| rmtc-Config-r16 | SetupRelease {RMTC-Config-r16} |
| OPTIONAL,  -- Need M | |
| t312-r16 | SetupRelease {  T312-16  } |
| OPTIONAL   -- Need M | |
| ]] | |
| } | | ssbFrequency: may set the frequency of the synchronization signal related to MeasObjectNR.

ssbSubcarrierSpacing: sets the subcarrier spacing of SSB. FR1 may only apply 15 kHz or 30 kHz, and FR2 may only apply 120 kHz or 240 kHz.

smtc1: indicates the SS/PBCH block measurement timing configuration, and may set the primary measurement timing configuration and set the timing offset and duration for SSB.

smtc2: may set the secondary measurement timing configuration for SSB related to MeasObjectNR with the PCI listed in the pci-List.

This may also be set through other higher layer signaling. For example, the SMTC may be configured in the UE through reconfigurationWithSync for NR PSCell change or NR PCell change or SIB2 for intra-frequency, inter-frequency, and inter-RAT cell reselection. Further, the SMTC may be configured in the UE through SCellConfig for adding an NR SCell.

The UE may configure the first SS/PBCH block measurement timing configuration (SMTC) according to the periodicityAndOffset (providing periodicity and offset) through smtc1 configured through higher layer signaling for SSB measurement. In an embodiment, the first subframe of each SMTC occasion may start in the subframe of SpCell and the system frame number (SFN) meeting the conditions of Table 5.

TABLE 5

SFN mod T = (FLOOR (Offset/10));
    if the Periodicity is larger than sf5:
        subframe = Offset mod 10;
    else:
        subframe = Offset or (Offset +5);
    with T = CEIL(Periodicity/10).

If smtc2 is set, the UE may configure an additional SMTC according to the offset and duration of smtc1 and the periodicity of smtc2 configured, for the cells indicated by the pci-List value of smtc2 in the same MeasObjectNR. In addition, the UE may have the smtc configured thereto through the smtc3list for smtc2-LP (with long periodicity) and integrated access and backhaul-mobile termination (IAB-MT) for the same frequency (e.g., frequency for intra frequency cell reselection) or other frequencies (e.g., frequencies for inter frequency cell reselection) and may measure the SSB. In an embodiment, the UE may not consider the SSB transmitted in a subframe other than the SMTC occasion for SSB-based RRM measurement at the configured ssbFrequency.

The base station may use various multi-transmit/receive point (TRP) operation methods depending on the serving cell configuration and physical cell identifier (PCI) configuration. Among them, there may be two methods for operating the two TRPs when two TRPs positioned in a distance physically away from each other have different PCIs.

[Operation Method 1]

The two TRPs having different PCIs may be operated as two serving cell configurations.

The base station may include the channels and signals transmitted in different TRPs through operation method 1 in different serving cell configurations and configure them. In other words, each TRP may have an independent serving cell, and frequency bandwidth value FrequencyInfoDLs indicated by the DownlinkConfigCommon in the serving cell configurations may indicate bands that at least partially overlap each other. Since the several TRPs operate based on multiple ServCellIndexes (e.g., ServCellIndex #1 and ServCellIndex #2), each TRP may use a separate PCI. In other words, the base station may assign one PCI to each ServCellIndex.

In this case, when several SSBs are transmitted in TRP 1 and TRP 2, the SSBs may have different PCIs (e.g., PCI #1 and PCI #2), and the base station may properly select the ServCellIndex value indicated by the cell parameter in QCL-Info, map the PCI suitable for each TRP, and designate the SSB transmitted in either TRP 1 or TRP 2 as the source reference RS of the QCL configuration information. However, this configuration is to apply one serving cell configuration available for carrier aggregation (CA) to multiple TRPs and may thus restrict the degree of freedom of the CA configuration or increase signaling loads.

[Operation Method 2]

The two TRPs having different PCIs may be operated as one serving cell configuration.

The base station may configure the channels and signals transmitted in different TRPs through operation method 2 through one serving cell configuration. Since the UE operates based on one ServCellindex (e.g., ServCellindex #1), it is impossible to recognize the PCI assigned to the second TRP (e.g., PCI #2). Operation method 1 may have a degree of freedom of CA configuration as compared with operation method 1 described above. However, when several SSBs are transmitted in TRP 1 and TRP 2, the SSBs may have different PCIs (e.g., PCI #1 and PCI #2), and the base station may not be able to map the PCI (e.g., PCI #2) of the second TRP through the ServCellIndex indicated by the cell parameter in QCL-Info. The base station may only designate the SSB transmitted in TRP 1 with the source reference RS of the QCL configuration information and may not be able to designate the SSB transmitted in TRP 2.

As described above, operation method 1 may perform multi-TRP operation for two TRPs having different PCIs through an additional serving cell configuration without support of additional specifications, but operation method 2 may operate based on the following additional UE capability report and base station configuration information.

Regarding UE Capability Report for Operation Method 2

The UE may report, to the base station, through UE capability, that it is possible to configure the PCI of the serving cell and another additional PCI through higher layer signaling from the base station. The UE capability may include X1 and X2 which are numbers independent of each other, or X1 and X2 may be reported as independent UE capabilities.

X1 means the maximum number of additional PCIs configurable to the UE. The PCI may be different from the PCI of the serving cell and, in this case, may mean the case where the time domain position and periodicity of the SSB corresponding to the additional PCI are the same as those of the SSB of the serving cell.

X2 means the maximum number of additional PCIs configurable to the UE. In this case, the PCI may be different from the PCI of the serving cell and, in this case, may mean the case where the time domain position and periodicity of the SSB corresponding to the additional PCI are different from those of the SSB corresponding to the PCI reported as X1.

By definition, the PCIs corresponding to the values reported as X1 and X2 may not be set simultaneously with each other.

The values reported as X1 and X2 reported through the UE capability report may each have a value of one integer from 0 to 7.

The values reported as X1 and X2 may be reported as different values in FR1 and FR2.

Regarding higher layer signaling configuration for operation method 2

The UE may have SSB-MTCAdditionalPCI-r17, which is higher layer signaling, configured thereto by the base station based on the above-described UE capability report. The higher layer signaling may include a plurality of additional PCIs having different values from, at least, the serving cell, the SSB transmission power corresponding to each additional PCI, and ssb-PositionInBurst corresponding to each additional PCI. The maximum number of additional PCIs configurable may be seven.

The UE may be assumed to have the same center frequency, subcarrier spacing, and subframe number offset as those of the serving cell as an assumption for the SSB configured to an additional PCI having a different value from that of the serving cell.

The UE may assume that the reference RS (e.g., SSB or CSI-RS) corresponding to the PCI of the serving cell is connected to the always-active TCI state. When there are one or more additionally configured PCIs having a value different from the serving cell, only one PCI among the PCIs may be assumed to be connected to the activated TCI state.

When the UE has two different corsesetPoolIndexes configured thereto, the reference RS corresponding to the serving cell PCI is connected to one or more activated TCI states, and the reference RS corresponding to the additionally configured PCI having a different value from that of the serving cell is connected to one or more activated TCI states, the UE may expect that the activated TCI state(s) connected with the serving cell PCI are connected to one of the two coresetPoolIndexes, and the activated TCI state(s) connected with the additionally configured PCI having a different value from that of the serving cell are connected to the remaining one coresetPoolIndex.

UE capability reporting and base station higher layer signaling for operation method 2 described above may configure an additional PCI having a value different from that of the PCI of the serving cell. When the configuration is absent, the SSB corresponding to the additional PCI having a different value from the PCI of the serving cell which may not be designated by the source reference RS may be used for the purpose of designating the source reference RS of the QCL configuration information. Further, unlike the SSB configurable for use for the purpose of RRM, mobility, or handover, such as the configuration information about the SSB configurable in smtc1 and smtc2 which is the higher layer signaling, it may be used to serve as a QCL source RS for supporting multi-TRP operations having different PCIs.

Next, a demodulation reference signal (DMRS) which is a reference signal in the 5G system is specifically described.

The DMRS may be composed of several DMRS ports. The ports maintain orthogonality not to interfere with each other using code division multiplexing (CDM) or frequency division multiplexing (FDM). However, the term "DMRS" may be replaced with a different term depending on the user's intent or the purpose of use of the reference signal. The term "DMRS" is provided merely for better understanding of the disclosure, and the disclosure should not be limited thereto or thereby. In other words, it will be apparent to one of ordinary skill in the art that it may be applied to any reference signal based on the technical spirit of the disclosure.

Figure 8:
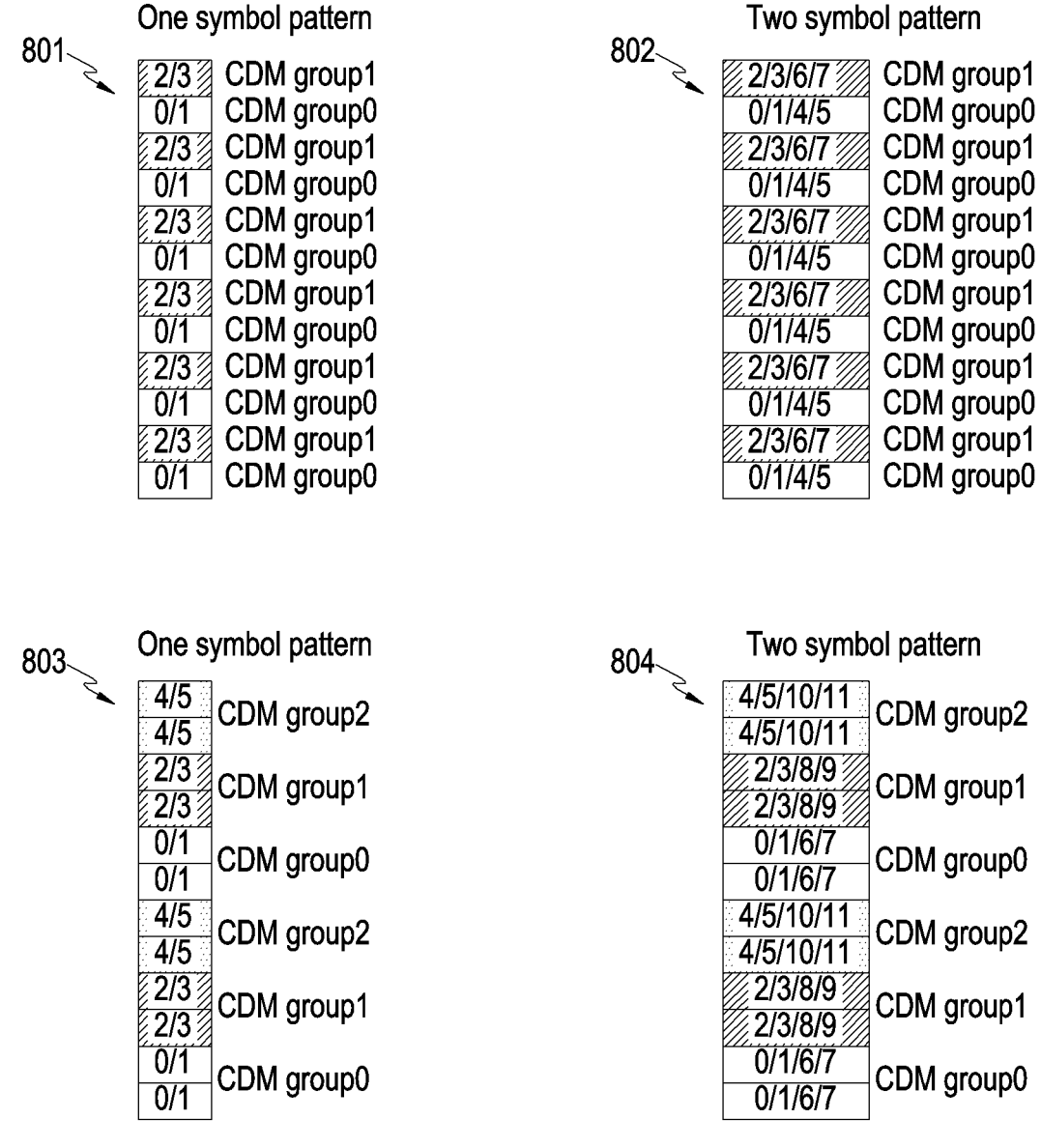
FIG. 8 is a view illustrating a DMRS pattern (type 1 and type 2) used for communication between base station and UE in a 5G system according to an embodiment of the disclosure.

FIG. 8 is a view illustrating a DMRS pattern (type 1 and type 2) used for communication between base station and UE in a 5G system according to an embodiment of the disclosure. In the 5G system, two DMRS patterns may be supported. FIG. 8 illustrates two DMRS patterns.

Referring to FIG. 8, reference numerals 801 and 802 correspond to DMRS type 1, where reference numeral 801 denotes a 1 symbol pattern and reference numeral 802 denotes a 2 symbol pattern. DMRS type 1 of reference numerals 801 and 802 is a comb 2-structure DMRS pattern and may be composed of two CDM groups. The different CDM groups may be FDMed.

In the 1 symbol pattern 801, frequency CDM is applied to the same CDM group, distinguishing the two DMRS ports. Therefore, a total of 4 orthogonal DMRS ports may be configured. The 1 symbol pattern 801 may include a DMRS port ID mapped to each CDM group (DMRS port ID for downlink may be represented by the shown+number 1000). In the 2 symbol pattern 802, time/frequency CDM is applied to the same CDM group, distinguishing the four DMRS ports. Therefore, a total of 8 orthogonal DMRS ports may be configured. The 2 symbol pattern 802 may include a DMRS port ID mapped to each CDM group (DMRS port ID for downlink may be represented by the shown+number 1000).

DMRS type2 indicated by reference numerals 803 and 804 is a DMRS pattern having a structure in which frequency domain orthogonal cover codes (FD-OCC) are applied to subcarriers adjacent in frequency, and may be composed of three CDM groups. The different CDM groups may be FDMed.

In the 1 symbol pattern 803, frequency CDM is applied to the same CDM group, distinguishing the two DMRS ports. Therefore, a total of 6 orthogonal DMRS ports may be configured. The 1 symbol pattern 803 may include a DMRS port ID mapped to each CDM group (DMRS port ID for downlink may be represented by the shown+number 1000). In the 2 symbol pattern 704, time/frequency CDM is applied to the same CDM group, distinguishing the four DMRS ports. Therefore, a total of 12 orthogonal DMRS ports may be configured. The 2 symbol pattern 804 may include a DMRS port ID mapped to each CDM group (DMRS port ID for downlink may be represented by the shown+number 1000).

As described above, in the NR system, two different DMRS patterns (e.g., DMRS patterns 801 and 802 or DMRS patterns 803 and 804) may be configured. Whether each DMRS pattern is a one symbol pattern 801 or 803 or an adjacent-two-symbol pattern 802 or 804 may also be set. Further, in the NR system, not only DMRS port numbers are scheduled, but also the number of CDM groups scheduled together may be set and signaled for PDSCH rate matching. Further, in the case of cyclic prefix based orthogonal frequency division multiplex (CP-OFDM), both the DMRS patterns described above may be supported in DL and UL. In the case of discrete Fourier transform spread OFDM (DFT-S-OFDM), only DMRS type1 among the DMRS patterns described above may be supported in UL.

Further, it may be supported to configure additional DMRSs. Front-loaded DMRS refers to the first DMRS transmitted/received in the first symbol in the time domain among DMRSs, and additional DMRS refers to a DMRS transmitted/received in a symbol behind the front-loaded DMRS in the time domain. In the NR system, the number of additional DMRSs may be set from a minimum of 0 to a maximum of 3. Further, when an additional DMRS is configured, the same pattern as the front-loaded DMRS may be assumed. In an embodiment, information about whether the DMRS pattern type described above for the front-loaded DMRS is type 1 or type 2, information about whether the DMRS pattern is a one-symbol pattern or an adjacent-two-symbol pattern, and information about the number of DMRS ports and used CDM groups, when an additional DMRS is further configured, it may be assumed that the additional DMRS has the same DMRS information as the front-loaded DMRS configured.

In an embodiment, the downlink DMRS configuration described above may be configured through RRC signaling as shown in Table 6.

Here, dmrs-Type may set the DMRS type, dmrs-AdditionalPosition may set additional DMRS OFDM symbols, phaseTrackingRS may set PTRS, and maxLength may set 1 symbol DMRS pattern or 2 symbol DMRS pattern. scramblingID0 and scramblingID1 may set scrambling ID0s, and nPUSCH-Identity may set the cell ID for DFT-s-OFDM. sequenceGroupHopping may disable sequence group hopping, and sequenceHopping may enable sequence hopping.

Figure 9:
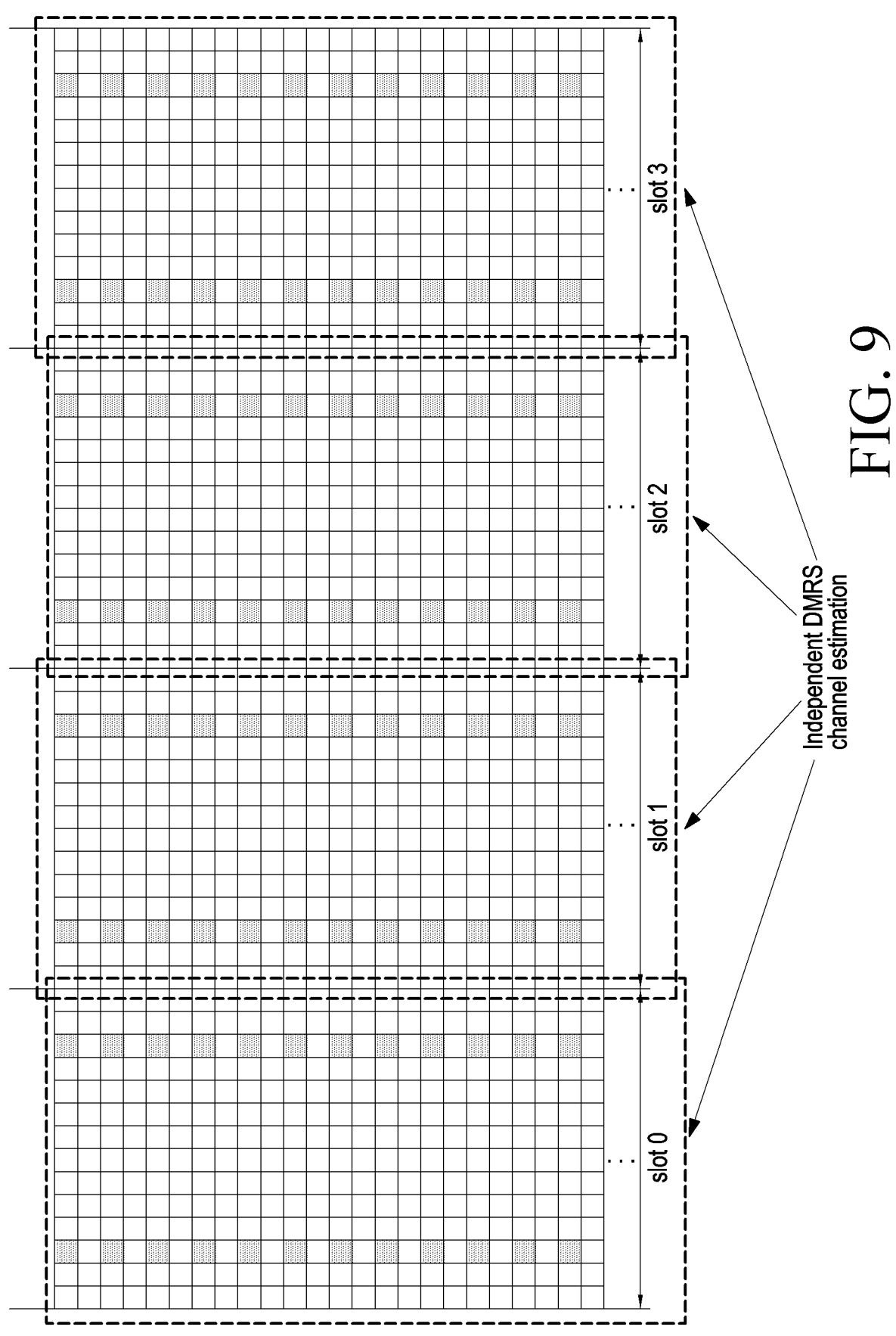
FIG. 9 is a view illustrating an example of channel estimation using a DMRS received in one PUSCH in a time domain of a 5G system according to an embodiment of the disclosure.

FIG. 9 is a view illustrating an example of channel estimation using a DMRS received in one physical uplink shared channel (PUSCH) in a time domain of a 5G system according to an embodiment of the disclosure.

Referring to FIG. 9, in performing channel estimation for data decoding by DMRS, channel estimation may be performed within the precoding resource block group (PRG), which is a corresponding bundling unit, by the physical resource block (PRB) bundling linked to system band in the frequency band. Further, in a unit of time, channel estimation is performed under the assumption that precoding is the same for the DMRS received on only one PUSCH.

Figure 10:
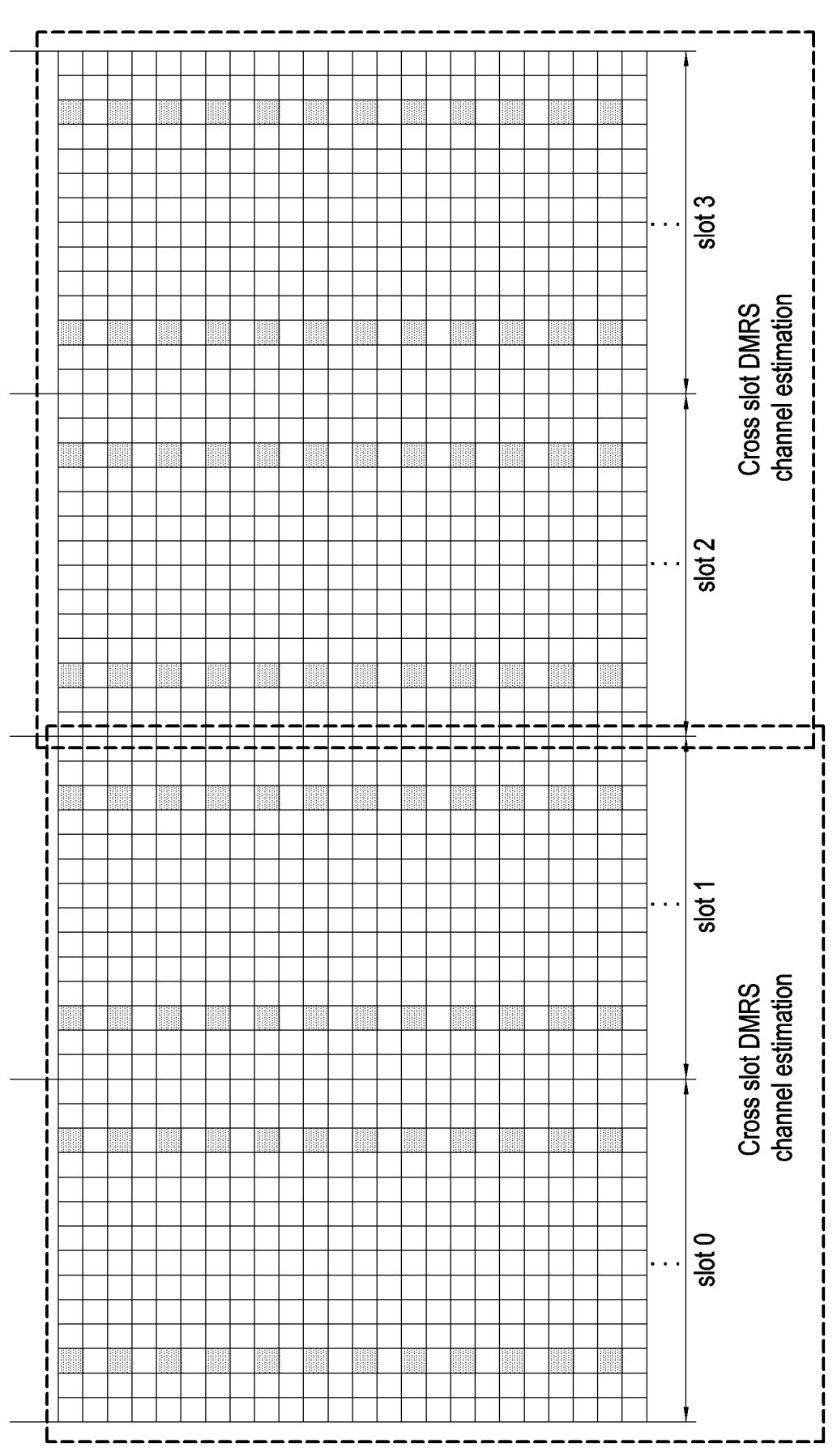
FIG. 10 is a view illustrating an example of simultaneous channel estimation using a DMRS received in a plurality of PUSCHs in a time domain of a 5G system according to an embodiment of the disclosure.

FIG. 10 is a view illustrating an example of simultaneous channel estimation using a DMRS received in a plurality of PUSCHs in a time domain of a 5G system according to an embodiment of the disclosure.

Referring to FIG. 10, the base station may indicate whether the UE uses the same precoding through configu-

TABLE 6

| DMRS-DownlinkConfig ::= | SEQUENCE { | |
|---|---|---|
| dmrs-Type | ENUMERATED {type2} | OPTIONAL, -- Need S |
| dmrs-AdditionalPosition | ENUMERATED {pos0, pos1, pos3} | OPTIONAL, -- Need S |
| maxLength | ENUMERATED {len2} | OPTIONAL, -- Need S |
| scramblingID0 | INTEGER (0..65535) | OPTIONAL, -- Need S |
| scramblingID1 | INTEGER (0..65535) | OPTIONAL, -- Need S |
| phaseTrackingRS | SetupRelease {PTRS-DownlinkConfig} | OPTIONAL, -- Need M |
| ... | | |
| } | | |

Here, dmrs-type may set the DMRS type, dmrs-AdditionalPosition may set additional DMRS OFDM symbols, maxLength may set 1 symbol DMRS pattern or 2 symbol DMRS pattern, scramblingID0 and scramblingID1 may set scrambling IDs, and phaseTrackingRS may set a phase tracking reference signal (PTRS).

Further, the uplink DMRS configuration described above may be configured through RRC signaling as shown in Table 7.

ration. Accordingly, the base station may estimate the channel by using DMRS transmissions using the same precoding together and may thus enhance DMRS channel estimation performance. To perform simultaneous channel estimation, power consistency and phase continuity of transmission power should be maintained. To maintain the power consistency and phase continuity of transmission power, the same transmission power and phase configuration, the same RB configuration, and the same MCS configuration are

TABLE 7

| DMRS-UplinkConfig ::= | SEQUENCE { | |
|---|---|---|
| dmrs-Type | ENUMERATED {type2} | OPTIONAL, -- Need S |
| dmrs-AdditionalPosition | ENUMERATED {pos0, pos1, pos3} | OPTIONAL, -- Need R |
| phase TrackingRS | SetupRelease { PTRS-UplinkConfig } | OPTIONAL, -- Need M |
| maxLength | ENUMERATED {len2} | OPTIONAL, -- Need S |
| transformPrecodingDisabled | SEQUENCE { | |
| scramblingID0 | INTEGER (0..65535) | OPTIONAL, -- Need S |
| scramblingID1 | INTEGER (0..65535) | OPTIONAL, -- Need S |
| ... | | OPTIONAL, -- Need R |
| } | | |
| transformPrecodingEnabled | SEQUENCE { | |
| nPUSCH-Identity | INTEGER (0..1007) | OPTIONAL, -- Need S |
| sequenceGroupHopping | ENUMERATED {disabled) | OPTIONAL, -- Need S |
| sequenceHopping | ENUMERATED {enabled} | OPTIONAL, -- Need S |
| ... | | |
| } | | OPTIONAL, -- Need R |
| ... | | |
| } | | | required, and DL transmission and reception and monitoring should not be performed between PUSCH/physical uplink control channel (PUCCH) where simultaneous channel estimation is performed. When the power consistency and phase continuity are maintained through the above configurations, simultaneous channel estimation using DMRS of multiple PUSCHs is possible.

Like in FIG. 9, even in FIG. 10, in performing channel estimation for data decoding by DMRS, channel estimation may be performed within the precoding resource block group (PRG), which is a corresponding bundling unit, by the physical resource block (PRB) bundling linked to system band in the frequency band. Further, in a unit of time, channel estimation is performed under the assumption that precoding is the same for the DMRS received on one or more PUSCHs. Thus, since channel estimation is possible based on several DMRSs in a time band, channel estimation performance may be enhanced. To enhance coverage, channel estimation performance may be very important because even when data decoding performance is good, channel estimation performance may become a bottleneck.

Hereinafter, a method for time domain resource allocation (TDRA) for a data channel in a 5G communication system is described. The base station may configure the UE with a table for time domain resource allocation information for a physical downlink shared channel (PDSCH) and a physical uplink shared channel (PUSCH) via higher layer signaling (e.g., RRC signaling).

For PDSCH, the base station may configure a table including up to maxNrofDL-Allocations=16 entries and, for PUSCH, configure a table including up to maxNrofUL-Allocations=17 entries. The time domain resource allocation information may include at least one of, e.g., PDCCH-to-PDSCH slot timing (which is designated K0 and corresponds to the time interval between the time of reception of the PDCCH and the time of transmission of the PDSCH scheduled by the received PDCCH) or PDCCH-to-PUSCH slot timing (which is designated K2 and corresponds to the time interval between the time of PDCCH and the time of transmission of the PUSCH scheduled by the received PDCCH), information for the position and length of the start symbol where the PDSCH or PUSCH is scheduled in the slot, and the mapping type of PDSCH or PUSCH.

In an embodiment, time domain resource allocation information for the PDSCH may be configured to the UE through RRC signaling as shown in Table 8 below.

TABLE 8

| PDSCH-TimeDomainResourceAllocationList information element |
|---|
| PDSCH-TimeDomainResourceAllocationList ::=  SEQUENCE (SIZE(1..maxNrofDL-Allocations)) OF PDSCH-TimeDomainResourceAllocation<br>PDSCH-TimeDomainResourceAllocation ::=  SEQUENCE {<br>  k0                      INTEGER(0..32)          OPTIONAL,   -- Need S<br>  mappingType            ENUMERATED {typeA, typeB},<br>  startSymbolAndLength    INTEGER (0..127)<br>  repetitionNumber       ENUMERATED (n2, n3, n4, n5, n6, n7, n8, n16)  OPTIONAL,  -- Cond<br>Formats1-0and1-1<br>} |

Here, k0 may indicate the PDCCH-to-PDSCH timing (i.e., the slot offset between the DCI and the scheduled PDSCH) in each unit of slot, mappingType may indicate the PDSCH mapping type, startSymbolAndLength may indicate the start symbol and length of the PDSCH, and repetitionNumber may indicate the number of PDSCH transmission occasions according to the slot-based repetition scheme.

In an embodiment, time domain resource allocation information for the PUSCH may be configured to the UE through RRC signaling as shown in Table 9 below.

TABLE 9

| PUSCH-TimeDomainResourceAllocation information element |
|---|
| PUSCH-TimeDomainResourceAllocationList ::=     SEQUENCE (SIZE(1..maxNrofUL-Allocations)) OF PUSCH-TimeDomainResourceAllocation<br>PUSCH-TimeDomainResourceAllocation ::=    SEQUENCE {<br>  k2                      INTEGER(0..32)       OPTIONAL,  -- Need S<br>  mappingType            ENUMERATED {typeA, typeB},<br>  startSymbolAndLength    INTEGER (0.127)<br>}<br>PUSCH-Allocation-r16 ::=  SEQUENCE {<br>  mappingType-r16          ENUMERATED {typeA, typeB}     OPTIONAL,  -- Cond<br>NotFormat01-02-Or-TypeA<br>  startSymbolAndLength-s16  INTEGER (0..127)    OPTIONAL,  -- Cond NotFormat01-02-Or-TypeA<br>  startSymbol-r16         INTEGER (0..13)     OPTIONAL,  -- Cond RepTypeB<br>  length-r16               INTEGER (1..14)     OPTIONAL,  -- Cond RepTypeB<br>  numberOfRepetitions-r16  ENUMERATED {n1, n2, n3, n4, n7, n8, n12, n16} OPTIONAL,  -- Cond<br>Format01-02<br>  ...<br>} |

Here, k2 may indicate the PDCCH-to-PUSCH timing (i.e., the slot offset between the DCI and the scheduled PUSCH) in each unit of slot, mappingType may indicate the PUSCH mapping type, startSymbolAndLength or StartSymbol and length may indicate the start symbol and length of the PUSCH, and numberOfRepetitions may indicate the number of repetitions applied to PUSCH transmission.

The base station may indicate, to the UE, at least one of the entries in the table for the time domain resource allocation information through L1 signaling (e.g., downlink control information (DCI)) (which may be indicated with, e.g., the "time domain resource allocation" field in the DCI). The UE may obtain time domain resource allocation information for the PDSCH or PUSCH based on the DCI received from the base station.

Transmission of an uplink data channel (physical uplink shared channel (PUSCH)) in the 5G system is described below. PUSCH transmission may be dynamically scheduled by the UL grant in the DCI (e.g., referred to as dynamic grant (DG)-PUSCH), or may be scheduled by configured grant type 1 or configured grant type 2 (e.g., referred to as configured grant (CG)-PUSCH). Dynamic scheduling for PUSCH transmission may be indicated through, e.g., DCI format 0_0 or 0_1.

PUSCH transmission of configured grant type 1 may be semi-statically configured through reception of configuredGrantConfig including rrc-ConfiguredUplinkGrant of Table 10 through higher layer signaling without reception of the UL grant in the DCI. PUSCH transmission of configured grant type 2 may be semi-persistently scheduled by the UL grant in the DCI after receiving the configuredGrantConfig that does not include rrc-ConfiguredUplinkGrant of Table 10 through higher layer signaling.

In an embodiment, when PUSCH transmission is scheduled by the configured grant, parameters applied to PUSCH transmission may be configured through configuredGrantConfig which is the higher layer signaling of Table 10, except for specific parameters (e.g., dataScramblingIdentityPUSCH, txConfig, codebookSubset, maxRank, or scaling of UCI-OnPUSCH) provided through pusch-Config of Table 11 which is higher layer signaling. For example, if the UE receives transformPrecoder through configuredGrantConfig, which is higher layer signaling of Table 10, the UE may apply tp-pi2BPSK in push-Config of Table 11 for PUSCH transmission operated by the configured grant.

TABLE 10

| ConfiguredGrantConfig |
|---|
| ConfiguredGrantConfig ::=        SEQUENCE { |
| frequency Hopping        ENUMERATED {intraSlot, interSlot}        OPTIONAL,    -- Need S, |
| cg-DMRS-Configuration        DMRS-UplinkConfig, |
| mcs-Table        ENUMERATED {qam256, qam64LowSE}        OPTIONAL,    -- Need S |
| mcs-TableTransformPrecoder        ENUMERATED {qam256, qam64LowSE}        OPTIONAL,    -- Need S |
| uci-OnPUSCH        SetupRelease { CG-UCI-OnPUSCH }        OPTIONAL,    -- Need M |
| resourceAllocation        ENUMERATED    {   resource AllocationType0,   resourceAllocationType1, |
| dynamicSwitch }, |
| rbg-Size        ENUMERATED {config2}        OPTIONAL,    -- Need S |
| powerControlLoopToUse        ENUMERATED {n0, nl}, |
| p0-PUSCH-Alpha        P0-PUSCH-AlphaSetId, |
| transformPrecoder        ENUMERATED { enabled, disabled }        OPTIONAL,    -- Need S |
| nrofHARQ-Processes        INTEGER(1..17), |
| repK        ENUMERATED {n1, n2, n4, n8}, |
| repK-RV        ENUMERATED {s1-0231, s2-0303, s3-0000}        OPTIONAL,    -- Need R |
| periodicity        ENUMERATED { |
| sym2, sym7, sym1x14, sym2x14, sym4x14, sym5x14, sym8x14, sym10x14, sym17x14, sym20x14, |
| sym32x14, sym40x14, sym64x14, sym80x14, sym128x14, sym170x14, sym256x14, sym320x14, sym512x14, |
| sym640x14, sym1024x14, sym1280x14, sym2560x14, sym5120x14, |
| sym6, sym1x12, sym2x12, sym4x12, sym5x12, sym8x12, sym10x12, sym17x12, sym20x12, sym32x12, |
| sym40x12, sym64x12, sym80x12, sym128x12, sym170x12, sym256x12, sym320x12, sym512x12, |
| sym640x12, |
| sym1280x12, sym2560x12 |
| }, |
| configuredGrantTimer        INTEGER (1..64)        OPTIONAL,    -- Need R |
| rrc-ConfiguredUplinkGrant        SEQUENCE { |
| timeDomainOffset        INTEGER (0..5119), |
| timeDomainAllocation        INTEGER    (0..16) |
| frequencyDomainAllocation        BIT STRING (SIZE(18)), |
| antennaPort        INTEGER (0..31), |
| dmrs-SeqInitialization        INTEGER (0..1)        OPTIONAL,    -- Need R |
| precedingAndNumberOfLayers        INTEGER (0..63), |
| srs-ResourceIndicator        INTEGER (0..16)        OPTIONAL,    -- Need R |
| mcsAndTBS        INTEGER (0..31), |
| frequencyHoppingOffset        INTEGER (1.. maxNrofPhysicalResourceBlocks-1) OPTIONAL, |
| -- Need R |
| pathlossReferenceIndex        INTEGER (0..maxNrofPUSCH-PathlossReferenceRSs-1), |
| ... |
| }        OPTIONAL,    -- Need R |
| ... |
| } |

Next, a PUSCH transmission method is described. The DMRS antenna port for PUSCH transmission may be the same as the antenna port for SRS transmission. PUSCH transmission may follow a codebook-based transmission method and a non-codebook-based transmission method, respectively, depending on whether the value of txConfig in push-Config of Table 7, which is higher signaling, is 'codebook' or 'nonCodebook'. As described above, PUSCH transmission may be dynamically scheduled through DCI format 0_0 or 0_1 or be semi-statically configured by the configured grant.

If the UE is instructed to schedule PUSCH transmission through DCI format 0_0, the UE may perform beam configuration for PUSCH transmission using the pucch-spatial-RelationInfoID corresponding to UE-specific (dedicated) PUCCH resource having the lowest ID in the activated uplink bandwidth part (BWP) in the serving cell. In an embodiment, PUSCH transmission may be performed based on a single antenna port. The UE may not expect scheduling for PUSCH transmission through DCI format 0_0 in a BWP in which PUCCH resource including pucch-spatialRelation-Info is not configured. If the UE has not had txConfig in push-Config of Table 11 configured thereto, the UE may not expect to be scheduled through DCI format 0_1.

DCI, the SRS resource indicated by the corresponding SRI may mean the SRS resource corresponding to the SRI among SRS resources transmitted prior to the PDCCH including the SRI. Further, the TPMI and transmission rank may be given through the field precoding information and number of layers in the DCI or configured through precodingAndNumberOfLayers, which is higher level signaling. The TPMI may be used to indicate the precoder applied to PUSCH transmission.

The precoder to be used for PUSCH transmission may be selected from an uplink codebook having the same number of antenna ports as the nrofSRS-Ports value in SRS-Config, which is higher signaling. In codebook-based PUSCH transmission, the UE may determine a codebook subset based on the TPMI and codebookSubset in push-Config, which is higher signaling. In an embodiment, codebookSubset in push-Config, which is higher signaling, may be set to one of 'fullyAndPartialAndNonCoherent', 'partialAndNonCoherent', or 'nonCoherent' based on the UE capability reported by the UE to the base station.

If the UE reports 'partialAndNonCoherent' as the UE capability, the UE may not expect the value of codebook-Subset, which is higher signaling, to be set to 'fullyAndPartialAndNonCoherent'. Further, if the UE reports 'non-

TABLE 11

| PUSCH-Config | | | |
|---|---|---|---|
| PUSCH-Config ::= | SEQUENCE { | | |
| dataScramblingIdentityPUSCH | INTEGER (0..1023) | OPTIONAL, | -- Need S |
| txConfig | ENUMERATED {codebook, nonCodebook} | OPTIONAL, | -- Need S |
| dmrs-UplinkForPUSCH-MappingTypeA | SetupRelease { DMRS-UplinkConfig } | OPTIONAL, | -- Need M |
| dmrs-UplinkForPUSCH-MappingTypeB | SetupRelease { DMRS-UplinkConfig } | OPTIONAL, | -- Need M |
| pusch-PowerControl | PUSCH-PowerControl | OPTIONAL, | -- Need M |
| frequencyHopping | ENUMERATED {intraSlot, interSlot} | OPTIONAL, | -- Need S |
| frequencyHoppingOffsetLists | SEQUENCE (SIZE (1..4)) OF INTEGER (1.. maxNrofPhysicalResourceBlocks-1) | OPTIONAL, | -- Need M |
| resource Allocation | ENUMERATED { resourceAllocationType0, resourceAllocationType1, dynamicSwitch}, | | |
| pusch-TimeDomainAllocationList | SetupRelease { PUSCH-TimeDomainResourceAllocationList } | OPTIONAL, | -- Need M |
| pusch-AggregationFactor | ENUMERATED { n2, n4, n8 } | OPTIONAL, | -- Need S |
| mcs-Table | ENUMERATED {qam256, qam64LowSE} | OPTIONAL, | -- Need S |
| mcs-TableTransformPrecoder | ENUMERATED {qam256, qam64LowSE} | OPTIONAL, | -- Need S |
| transformPrecoder | ENUMERATED {enabled, disabled} | OPTIONAL, | -- Need S |
| codebookSubset | ENUMERATED {fullyAndPartialAndNonCoherent, partialAndNonCoherent,nonCoherent} | OPTIONAL, | -- Cond codebookBased |
| maxRank | INTEGER (1..4) | OPTIONAL, | -- Cond codebookBased |
| rbg-Size | ENUMERATED { config2} | OPTIONAL, | -- Need S |
| uci-OnPUSCH | SetupRelease { UCI-OnPUSCH} | OPTIONAL, | -- Need M |
| ip-pi2BPSK | ENUMERATED {enabled} | OPTIONAL, | -- Need S |
| ... | | | |
| } | | | |

Next, codebook-based PUSCH transmission is described. Codebook-based PUSCH transmission may be dynamically operated through DCI format 0_0 or 0_1 or be semi-statically configured by the configured grant. if dynamically scheduled by codebook-based PUSCH DCI format 0_1 or semi-statically configured by configured grant, the UE may determine a precoder for PUSCH transmission based on the SRS resource indicator (SRI), transmission precoding matrix indicator (TPMI), and transmission rank (number of PUSCH transmission layers).

In an embodiment, the SRI may be given through a field SRS resource indicator in the DCI or configured through srs-ResourceIndicator which is higher signaling. The UE may have at least one SRS resource, e.g., up to two SRS resources, configured thereto upon codebook-based PUSCH transmission. When the UE receives the SRI through the Coherent' as the UE capability, the UE may not expect the value of codebookSub set, which is higher signaling, to be set to 'fullyAndPartialAndNonCoherent' or 'partialAndNonCoherent'. If nrofSRS-Ports in SRS-ResourceSet, which is higher signaling, indicates two SRS antenna ports, the UE may not expect the value of codebookSubset, which is higher signaling, to be set to 'partialAndNonCoherent'.

The UE may have one SRS resource set, in which the value of usage in SRS-ResourceSet, which is higher signaling, is set to 'codebook,' configured thereto, and one SRS resource in the corresponding SRS resource set may be indicated through the SRI. If several SRS resources are configured in the SRS resource set in which the usage value in the SRS-ResourceSet, which is higher signaling, is set to 'codebook', the UE may expect the same value to be set for all SRS resources in the nrofSRS-Ports value in the SRS-Resource which is higher signaling.

The UE may transmit one or more SRS resources included in the SRS resource set in which the value of usage is set to 'codebook' according to higher signaling to the base station, and the base station may select one of the SRS resources transmitted by the UE and instruct the UE to perform PUSCH transmission using transmission beam information about the corresponding SRS resource. In an embodiment, in codebook-based PUSCH transmission, the SRI is used as information for selecting an index of one SRS resource and may be included in the DCI. Additionally, the base station may include information indicating the TPMI and rank to be used by the UE for PUSCH transmission in the DCI and transmit it. The UE may perform PUSCH transmission by applying the precoder indicated by the rank and TPMI indicated by the transmission beam of the SRS resource using the SRS resource indicated by the SRI.

Next, non-codebook-based PUSCH transmission is described. Non-codebook-based PUSCH transmission may be dynamically operated through DCI format 0_0 or 0_1 or be semi-statically configured by the configured grant. When at least one SRS resource is configured in the SRS resource set in which the value of usage in the SRS-ResourceSet, which is higher signaling, is set to 'nonCodebook', the UE may be scheduled for non-codebook based PUSCH transmission through DCI format 0_1.

For the SRS resource set in which the value of usage in the SRS-ResourceSet, which is higher signaling, is set to 'nonCodebook', the UE may have a non-zero power (NZP) CSI-RS resource associated with one SRS resource set configured thereto. The UE may perform calculation on the precoder for SRS transmission through measurement of the NZP CSI-RS resource configured in association with the SRS resource set. If the difference between the last received symbol of the aperiodic NZP CSI-RS resource associated with the SRS resource set and the first symbol of aperiodic SRS transmission in the UE is smaller than specific symbols (e.g., 42 symbols), the UE may not expect that information about the precoder for SRS transmission is updated.

When the value of resourceType in SRS-ResourceSet, which is higher signaling, is set to 'aperiodic', the NZP CSI-RS associated with the SRS-ResourceSet may be indicated by an SRS request, which is a field in DCI format 0_1 or 1_1. In an embodiment, if the NZP CSI-RS resource associated with the SRS-ResourceSet is an aperiodic NZP CSI resource and the value of the field SRS request in DCI format 0_1 or 1_1 is not '00', it may indicate that the NZP CSI-RS associated with the SRS-ResourceSet is present. The DCI may not indicate cross carrier or cross BWP scheduling. If the value of the SRS request indicates the presence of the NZP CSI-RS, the NZP CSI-RS may be positioned in the slot in which the PDCCH including the SRS request field is transmitted. TCI states configured in the scheduled subcarrier may not be set to QCL-typeD.

If a periodic or semi-persistent SRS resource set is configured, the NZP CSI-RS associated with the SRS resource set may be indicated through associatedCSI-RS in the SRS-ResourceSet, which is higher signaling. For non-codebook-based transmission, the UE may not expect spatialRelationInfo, which is higher signaling for SRS resource, and associatedCSI-RS in SRS-ResourceSet, which is higher signaling, to be configured together.

When a plurality of SRS resources are configured to the UE, the UE may determine the precoder and transmission rank to be applied to PUSCH transmission based on the SRI indicated by the base station. In an embodiment, the SRI may be indicated through a field SRS resource indicator in the DCI or be configured through srs-ResourceIndicator which is higher signaling. Like the above-described codebook-based PUSCH transmission, when the UE receives the SRI through the DCI, the SRS resource indicated by the corresponding SRI may mean the SRS resource corresponding to the SRI among SRS resources transmitted prior to the PDCCH including the SRI. The UE may use one or more SRS resources for SRS transmission. The maximum number of SRS resources and the maximum number of SRS resources that may be simultaneously transmitted in the same symbol within one SRS resource set may be determined by the UE capability reported by the UE to the base station. The SRS resources transmitted simultaneously by the UE may occupy the same RB. The UE may configure one SRS port for each SRS resource. Only one SRS resource set in which the value of usage in the SRS-ResourceSet, which is higher signaling, is set to 'nonCodebook' may be configured, and up to 4 SRS resources may be configured for non-codebook-based PUSCH transmission.

The base station may transmit one NZP CSI-RS associated with the SRS resource set to the UE, and the UE may calculate the precoder to be used for transmission of one or more SRS resources in the SRS resource set based on the measurement result upon NZP CSI-RS reception. The UE may apply the calculated precoder when transmitting one or more SRS resources in the SRS resource set with usage set to 'nonCodebook' to the base station, and the base station may select one or more SRS resources among one or more SRS resources received. In non-codebook based PUSCH transmission, the SRI may indicate an index that may represent a combination of one or a plurality of SRS resources, and the SRI may be included in the DCI. The number of SRS resources indicated by the SRI transmitted by the base station may be the number of transmission layers of the PUSCH. The UE may apply the precoder applied to SRS resource transmission to each layer and transmit the PUSCH.

A single TB transmission method through repeated transmission of an uplink data channel (PUSCH) and multiple slots in a 5G system is described below. The 5G system may support two types (e.g., PUSCH repeated transmission type A and PUSCH repeated transmission type B) of repeated transmission methods of uplink data channel and TB processing over multi-slot PUSCH (TBoMS) that transmits a single TB over multi-slot PUSCH. Further, the UE may have either PUSCH repeated transmission type A or B configured thereto by higher layer signaling. Further, the UE may have a numberOfSlotsTBoMS' configured thereto through the resource allocation table and transmit the TBoMS.

PUSCH Repeated Transmission Type A

As described above, as the time domain resource allocation method in one slot, the start symbol and length of the uplink data channel may be transmitted, and the base station may transmit the number of repeated transmissions to the UE through higher layer signaling (e.g., RRC signaling) or L1 signaling (e.g., DCI). To determine the TBS, the number N of the slots set to numberOfSlotsTBoMS may be 1.

The UE may repeatedly transmit uplink data channels, which are identical in start symbol and length to the configured uplink data channel, in consecutive slots based on the number of repeated transmissions received from the base station. In an embodiment, when at least one symbol in the slot for uplink data channel repeated transmission configured to the UE or the slot configured to the UE in the downlink by the base station is configured in the downlink, the UE may omit uplink data channel transmission in the corresponding slot. For example, the UE may not transmit uplink data channel within the number of repeated transmissions of uplink data channel. In contrast, the UE supporting Rel-17 uplink data repeated transmission may determine that the slot capable of uplink data repeated transmission is an available slot, and count the number of transmissions upon uplink data channel repeated transmission for the slot determined to be an available slot. When the uplink data channel repeated transmission determined to be an available slot is omitted, it may be postponed, and then, be repeatedly transmitted through a transmittable slot. By use of Table 12 below, a redundancy version may be applied according to the redundancy version pattern set for each nth PUSCH transmission occasion.

PUSCH Repeated Transmission Type B

As described above, as the time domain resource allocation method in one slot, the start symbol and length of the uplink data channel may be transmitted, and the base station may transmit the number of repeated transmissions, numberofrepetitions, to the UE through higher layer signaling (e.g., RRC signaling) or L1 signaling (e.g., DCI). In an embodiment, to determine the TBS, the number N of the slots set to numberOfSlotsTBoMS may be 1.

First, the nominal repetition of the uplink data channel may be determined as follows based on the start symbol and length of the uplink data channel configured above. Here, nominal repetition may mean the resources of the symbols configured by the base station for repeated PUSCH transmission. The UE may determine resources available for uplink in the configured nominal repetition. in this case, the slot where the nth nominal repetition starts may be given by $$K_s + \left\lfloor \frac{S + n \cdot L}{N_{symb}^{slot}} \right\rfloor,$$

and the symbol where the nominal repetition starts in the start slot may be given by $$\mod\left(S + n \cdot L, N_{symb}^{slot}\right).$$

The slot where the nth nominal repetition ends may be given by $$K_s + \left\lfloor \frac{S + (n+1) \cdot L - 1}{N_{symb}^{slot}} \right\rfloor,$$

and the symbol where the nominal repetition ends in the last slot may be given by $$\mod\left(S + (n+1) \cdot L - 1, N_{symb}^{slot}\right).$$

Here, n=0, . . . , numberofrepetitions−1, S may indicate the start symbol of the configured uplink data channel, and L may indicate the symbol length of the configured uplink data channel. $K_s$ may indicate the slot in which PUSCH transmission starts, and $$N_{symb}^{slot}$$

may indicate the number of symbols per slot.

The UE may determine an invalid symbol for PUSCH repeated transmission type B. The symbol configured as downlink by tdd-UL-DL-ConfigurationCommon or tdd-UL-DL-ConfigurationDedicated may be determined to be an invalid symbol for PUSCH repeated transmission type B. Additionally, the invalid symbol may be configured based on the higher layer parameter (e.g., InvalidSymbolPattern). As an example, as the higher layer parameter (e.g., InvalidSymbolPattern) provides a symbol level bitmap over one or two slots, an invalid symbol may be configured. In an embodiment, in the bitmap, 1 may indicate an invalid symbol. Additionally, the periodicity and pattern of the bitmap may be configured through the higher layer parameter (e.g., periodicityAndPattern). If the higher layer parameter (e.g., InvalidSymbolPattern) is configured, and InvalidSymbolPatternIndicator-ForDCIFormat0_1 or InvalidSymbolPatternIndicator-ForDCIFormat0_2 parameter indicates 1, the UE may apply the invalid symbol pattern and, if it indicates 0, may not apply the invalid symbol pattern. Or, if the higher layer parameter (e.g., InvalidSymbolPattern) is configured, and InvalidSymbolPatternIndicator-ForDCIFormat0_1 or InvalidSymbolPatternIndicator-ForDCIFormat0_2 parameter is not configured, the UE may apply the invalid symbol pattern.

After the invalid symbol is determined in each nominal repetition, the UE may consider symbols other than the determined invalid symbol as valid symbols. If each nominal repetition includes one or more valid symbols, the nominal repetition may include one or more actual repetitions. Here, each actual repetition may mean the symbol actually used for PUSCH repeated transmission among the symbols configured in the configured nominal repetition, and may include consecutive sets of valid symbols that may be used for PUSCH repeated transmission type B in one slot. when the actual repetition having one symbol is set to valid except where the symbol length L of the configured uplink data channel is 1, the UE may omit the actual repetition transmission. By use of Table 8 below, a redundancy version may be applied according to the redundancy version pattern set for each nth actual repetition.

TB Processing Over Multiple Slots (TBoMS)

As described above, as the time domain resource allocation method in one slot, the start symbol and length of the uplink data channel may be transmitted, and the base station may transmit the number of repeated transmissions to the UE through higher layer signaling (e.g., RRC signaling) or L1 signaling (e.g., DCI). In an embodiment, the TBS may be determined using the N value not less than 1, the number of slots set as numberOfSlotsTBoMS.

The UE may transmit uplink data channels, which are identical in start symbol and length to the configured uplink data channel, in consecutive slots based on the number of repeated transmissions and the number of slots for determining the TBS, received from the base station. In an embodiment, when at least one symbol in the slot for uplink data channel repeated transmission configured to the UE or the slot configured to the UE in the downlink by the base station is configured in the downlink, the UE may omit uplink data channel transmission in the corresponding slot. For example, it may be included in the number of uplink data channel repeated transmissions, but may not be transmitted.

In contrast, the UE supporting Rel-17 uplink data repeated transmission may determine that the slot capable of uplink data repeated transmission is an available slot, and count the number of transmissions upon uplink data channel repeated transmission for the slot determined to be an available slot. When the uplink data channel repeated transmission determined to be an available slot is omitted, it may be postponed, and then, be repeatedly transmitted through a transmittable slot. in an embodiment, by use of Table 12 below, a redundancy version may be applied according to the redundancy version pattern set for each nth PUSCH transmission occasion.

TABLE 12

| $rv_{id}$ indicated by the DCI | $rv_{id}$ to be applied to $n^{th}$ transmission occasion (repetition Type A) or TB processing over multiple slots) or $n^{th}$ actual repetition (repetition Type B) | | | |
|---|---|---|---|---|
| scheduling the PUSCH | $((n-(n \bmod N))/N)$ mod 4 = 0 | $((n-(n \bmod N))/N)$ mod 4 = 0 | $((n-(n \bmod N))/N)$ mod 4 = 0 | $((n-(n \bmod N))/N)$ mod 4 = 0 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

A method for determining an uplink available slot for single or multi-PUSCH transmission in a 5G system is described below.

In an embodiment, if AvailableSlotCounting is set to enable in the UE, the UE may determine the available slot based on tdd-UL-DL-ConfigurationCommon, tdd-UL-DL-ConfigurationDedicated, ssb-PositionsInBurst and a time domain resource allocation (TDRA) information field value, for type A PUSCH repeated transmission and TBoMS PUSCH transmission. In other words, when at least one symbol configured with the TDRA for PUSCH in the slot for PUSCH transmission overlaps at least one symbol for other purposes than uplink transmission, the slot may be determined to be an unavailable slot.

In embodiments of the disclosure, a method for controlling SSB transmission through dynamic signaling to reduce energy consumption of a base station is proposed. In this case, a dynamic signaling method for controlling SSB transmission in a wireless system according to an embodiment and operations of a base station and a UE according to dynamic signaling may be determined.

According to an embodiment, the density of SSB transmission of the base station may be reduced, and the UE may does not receive unnecessary SSBs, reducing energy consumption.

According to an embodiment, in a 5G system, a mobile communication system may define a signal transmission method of a base station, thereby addressing excessive energy consumption and achieving high energy efficiency.

Effects of the disclosure are not limited to the foregoing, and other unmentioned effects would be apparent to one of ordinary skill in the art from the following description.

A base station energy saving method according to an embodiment is described below.

First Embodiment

A first embodiment of the disclosure describes the design of dynamic signaling for energy saving. In the following description, a state of applying the operation of saving energy by the base station and/or UE to be distinguished from conventional base station and/or UE operations is referred to as an energy saving mode (ES mode), and a state of the base station, of applying conventional base station operations is referred to as a base station normal mode. In the energy saving mode, the design of dynamic signaling to determine whether to transmit SSB by the base station and for the UE to receive whether to receive it may use at least one or a combination of method 1 and method 2 below. The term 'energy saving mode' is defined for convenience of description, and the operations according to the embodiments of the disclosure are not limited thereby.

[Method 1]

In the energy saving mode in method 1, the base station may indicate SSB configuration information to all UEs in the serving cell through the group common DCI and, upon receiving the SSB configuration information, the UE may determine whether to receive the SSB. All the UEs in the serving cell mean all UEs in the serving cell supporting the energy saving mode. For a UE(s) not supporting the energy saving mode in the serving cell, the SSB configuration information through the group common DCI may not apply. In the initial access and normal mode, the base station may configure SSB transmission through ssb-PositionsInBurst and ssb-periodicity configured in the bitmap in higher layer signaling (e.g., SIB1 or ServingCellConfigCommon). In this case, the UE may determine a resource for receiving the SSB based on the configured information. Thereafter, to save energy, the base station may reset whether to transmit the SSB in the group common DCI broadcast and having a network energy saving-radio network temporary identifier (nwes-RNTI)(or nes-RNTI). The group common DCI may include the cyclic redundancy check (CRC) scrambled by the nwes-RNTI. Accordingly, the UE having the nwes-RNTI may identify and receive the group common DCI.

Figure 11:
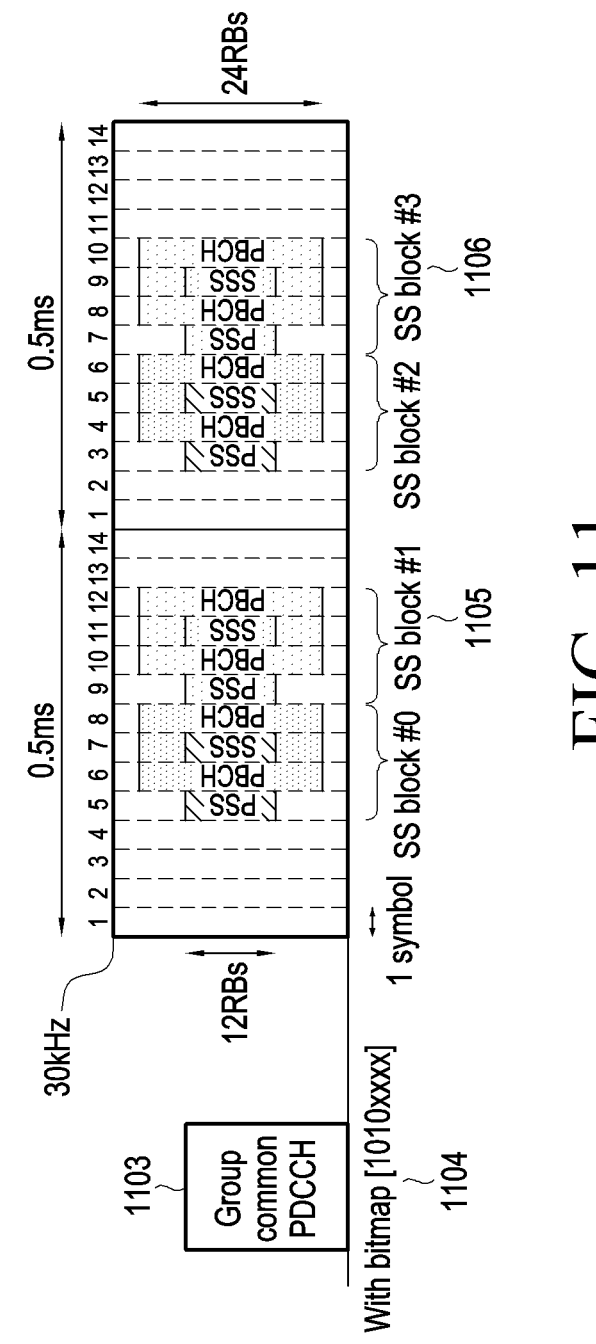
FIG. 11 is a view illustrating a method for reconfiguring SSB transmission through dynamic signaling of a 5G system according to an embodiment of the disclosure.

FIG. 11 is a view illustrating a method for reconfiguring SSB transmission through dynamic signaling according to an embodiment of the disclosure.

Referring to FIG. 11, when the UE may have ssb-PositionsInBurst='11110000' (1102) configured thereto through higher layer signaling (SIB1 or ServingCellConfig-Common) from the base station, and up to two synchronization signal block at a subcarrier spacing of 30 kHz may be transmitted within 0.5 ms (or when one slot is composed of 14 OFDM symbols, it corresponds to a length of one slot), and accordingly, the UE may receive four synchronization signal blocks within 1 ms (or, if 1 slot is composed of 14 OFDM symbols, it corresponds to a length of 2 slots). In this case, to reduce SSB transmission density to save energy, the base station may broadcast the bitmap '1010xxxx' (1104) through the group common DCI 1103 having the network energy saving-radio network temporary identifier) (nwes-RNTI) (or, es-RNTI), reconfiguring SSB transmission configuration information. In this case, transmission of SS block #1 1105 and SS block #3 1106 may be canceled based on the bitmap 1104 configured through the group common DCI. For example, in the bitmap '1010xxxx,' '1' may indicate transmission of the corresponding SS block (i.e., SSB), and '0' may indicate cancellation of transmission of the corresponding SS block. Conversely, in the bitmap, '1' may indicate cancellation of transmission of the corresponding SS block, and '0' may indicate transmission of the corresponding SS block. The number of bits of the bitmap may increase or decrease in the subcarrier space (SCS).

The group common DCI may include at least one of the following 1) to 3) information.

1) The bitmap indicating whether to cancel transmission of SS blocks (i.e., SSBs)

2) Offset information indicating the start point of SSB transmission cancellation operation 3) ssb-periodicity indicating SSB transmission periodicity information FIG. 11 provides a method 1101 for reconfiguring SSB transmission through bitmap-based group common DCI.

Further, the base station may reconfigure the ssb-periodicity configured through higher layer signaling to the UE(s) by the group common DCI. Specifically, when the group common DCI includes the ssb-periodicity indicating the SSB transmission periodicity information, the UE may reconfigure the ssb-periodicity, configured through higher layer signaling (e.g., SIB1 or ServingCellConfig Common) from the base station, to the ssb-periodicity included in the group common DCI. Further, timer information for indicating the period (duration or interval) during which the group common DCI is applied may further be configured (included) in the group common DCI, and the SSB may be transmitted through the reconfigured SSB configuration information through the group common DCI during the time range of the configured timer. The UE may identify the start point of the SSB transmission cancellation operation based on the offset information in the group common DCI and may perform bitmap-based SSB transmission or SSB transmission cancellation operation during the time range indicated by the timer information.

Then, if the timer expires, the base station may perform SSB transmission using the SSB configuration information configured by the existing higher layer signaling. As described above, in the disclosure, it is possible to change the SSB transmission-related configuration from the normal mode in which SSB transmission according to higher layer signaling is performed to the energy saving mode in which SSB transmission or SSB transmission cancellation is performed using the group common DCI and to reconfigure the SSB configuration information according to the energy saving mode. As described above, the base station may set the application time and period of the SSB configuration information reconfigured through the group common DCI to the UE with the above-described offset and duration information. In this case, the UE may not monitor the SSB during the duration from the time of receiving the group common DCI to the time of applying the offset.

Method 1 above is a method for the base station to indicate SSB reconfiguration information to all UEs supporting the energy saving mode in the cell, using the group common DCI so as to save energy. As such, signaling overhead may be reduced by instruct all UEs supporting the energy saving mode to configure using one group common DCI.

[Method 2]

In the energy saving mode in method 2, the base station may indicate SSB configuration information to one or more UEs in the serving cell through the UE specific DCI and, upon receiving the configuration information, the UE may determine whether to receive the SSB. The UE specific DCI may be provided to one or more UEs among the UEs supporting the energy saving mode in the serving cell. The one or more UEs (or a group of UEs) may be previously configured by the base station. SSB configuration information through the UE specific DCI may not be applied to UE(s) that do not support the energy saving mode in the serving cell.

In the initial access and normal mode, the base station may configure SSB transmission through ssb-PositionsIn-Burst and ssb-periodicity configured in the bitmap in higher layer signaling (e.g., SIB1 or ServingCellConfigCommon). In this case, the UE may determine a resource for receiving the SSB based on the configured information. Thereafter, to save energy, the base station may reset whether to transmit the SSB in the UE specific DCI capable of simultaneously supporting one or more UEs having a network energy saving-radio network temporary identifier (nwes-RNTI) (or es-RNTI). Here, the nwes-RNTI may be allocated to the one or a plurality of UEs by the base station. The UE specific DCI may include the CRC scrambled by the nwes-RNTI. Accordingly, the UE having the nwes-RNTI may identify and receive the UE specific DCI. In this case, to simultaneously indicate the one or more UEs, the UE-specific DCI that may simultaneously indicate the one or more UEs may be configured using the block index matched for each UE. For example, when the UE specific DCI that may simultaneously indicate one or more UEs is configured for three UEs (UE #0, UE #1, and UE #2), the UE specific DCI may be composed of blocks (Block #0, Block #1, and Block #2) including the respective pieces of SSB reconfiguration information of the UEs. In this case, each UE may identify the corresponding block index and receive SSB reconfiguration information. The method for reconfiguring whether to transmit the SSB through the UE specific DCI of method 2 may use the operations of FIG. 11 described above in connection with method 1 in the same manner. Thus, the UE specific DCI may include at least one of the information 1) to 3).

Further, the base station may reconfigure the ssb-periodicity configured through higher layer signaling through UE specific DCI that may simultaneously indicate the one or more UEs. Specifically, when the UE specific DCI includes the ssb-periodicity indicating the SSB transmission periodicity information, the UE may reconfigure the ssb-periodicity, configured through higher layer signaling (e.g., SIB1 or ServingCellConfigCommon) from the base station, to the ssb-periodicity included in the UE specific DCI. Further, timer information for indicating the period (duration or interval) during which the UE specific DCI capable of simultaneously indicating one or more UEs is applied may be further configured (included) in the UE specific DCI, so that the reconfigured SSB configuration information may be provided through the UE specific DCI that may be simultaneously provided to one or more UEs during the set time range of the timer, and the base station may transmit the SSB based on the reconfigured SSB configuration information.

Then, if the timer expires, the base station may perform SSB transmission using the SSB configuration information configured by the existing higher layer signaling. As described above, in the disclosure, it is possible to change the SSB transmission-related configuration from the normal mode in which SSB transmission according to higher layer signaling is performed to the energy saving mode in which SSB transmission or SSB transmission cancellation is performed using the UE specific DCI and to reconfigure the SSB configuration information according to the energy saving mode. Further, as described above, the base station may set the application time and period of the SSB configuration information reconfigured through the UE specific DCI, which may simultaneously indicate one or more UEs, to the UE with the above-described offset and duration information. In this case, the UE may not monitor the SSB during the duration from the time of applying the offset after receiving the UE specific DCI capable of simultaneously indicating one or more UEs. Whether the UE-specific DCI, which may simultaneously indicate one or more UEs, is decoded from the UE may be reported to the base station through the HARQ ACK.

Method 2 is a method in which the base station indicates the SSB reconfiguration information to all UEs in the cell through the UE specific DCI capable of simultaneously indicating one or more UEs. By a method for reconfiguring the SSB through the UE specific DCI on a small number of UEs in low traffic load context, signaling overhead may be reduced, and the base station may identify whether to receive from the UE UE-specifically, so that high-reliable transmission/reception may be achieved.

The SSB reconfiguring method through dynamic signaling for energy savings through the above-described methods may apply within the indicated SSB periodicity or to SSB transmission in the next period. Further, SSB configuration information of one or more cells may be reconfigured through the UE specific DCI capable of simultaneously indicating one or more UEs or the group common DCI including the pci-List information for one or more cells. Additionally, to reduce DCI size, the base station may reconfigure the SSB through the method for indicating the SSB-reconfigurable pattern information (e.g., ssb-PositionsInBurst bitmap pattern and ssb-periodicity pattern (20 ms=>80 ms=>40 ms)), preconfigured by higher layer signaling, through the DCI.

In the first embodiment, the SSB configuration information configured through higher layer signaling (SIB1 or ServingCellConfigCommon) and the SSB configuration information reconfigured through the group common DCI or UE specific DCI may be referred to as first SSB configuration information and second SSB configuration information, respectively.

Second Embodiment

A second embodiment of the disclosure describes operations of the base station and UE according to dynamic signaling for energy savings. In the following description, a state of applying the operation of saving energy by the base station and UE to be distinguished from conventional base station and UE operations is referred to as an energy saving mode (ES mode), and a state of the base station, of applying conventional base station operations is referred to as a base station normal mode.

FIG. 12 is a flowchart illustrating operations of a UE to reconfigure SSB transmission through dynamic signaling according to an embodiment of the disclosure. In various embodiments, at least one of the operations described below may be omitted, modified, or changed in order. The dynamic signaling (dynamic DCI) may use the group common DCI or the UE specific DCI.

Referring to FIG. 12, in operation 1201, the UE may receive information related to SSB configurations, e.g., ssb-PositionsInBurst information indicating the SSB transmission position and ssb-periodicity indicating the SSB transmission period, from the base station through higher layer signaling (e.g., SIB1 or ServingCellConfigCommon). The SSB configuration information provided through the higher layer signaling (e.g., SIB1 or Serving CellConfig-Common) is SSB configuration information applicable in the normal mode.

In operation 1202, the UE may determine whether to transmit/receive resources and other channels (e.g., PUCCH, PUCCH, PDSCH, and PDCCH) for receiving the SSB based on the first SSB configuration information configured through higher layer signaling. In operation 1203, the UE may receive second SSB configuration information for energy savings from the base station through L1 signaling (e.g., group common DCI or UE specific DCI indicating one or more UEs). In this case, the UE may not monitor the SSB based on the second SSB configuration information. In other words, the UE may not receive the SSB based on at least one of bitmap information indicating whether to cancel transmission of SSBs included in the second SSB configuration information, offset information indicating the start time of the SSB transmission cancellation operation, ssb-periodicity indicating the SSB transmission period information, or timer information.

Thereafter, in operation 1204, the UE may receive the SSB based on the second SSB configuration information configured through L1 signaling.

Figure 13:
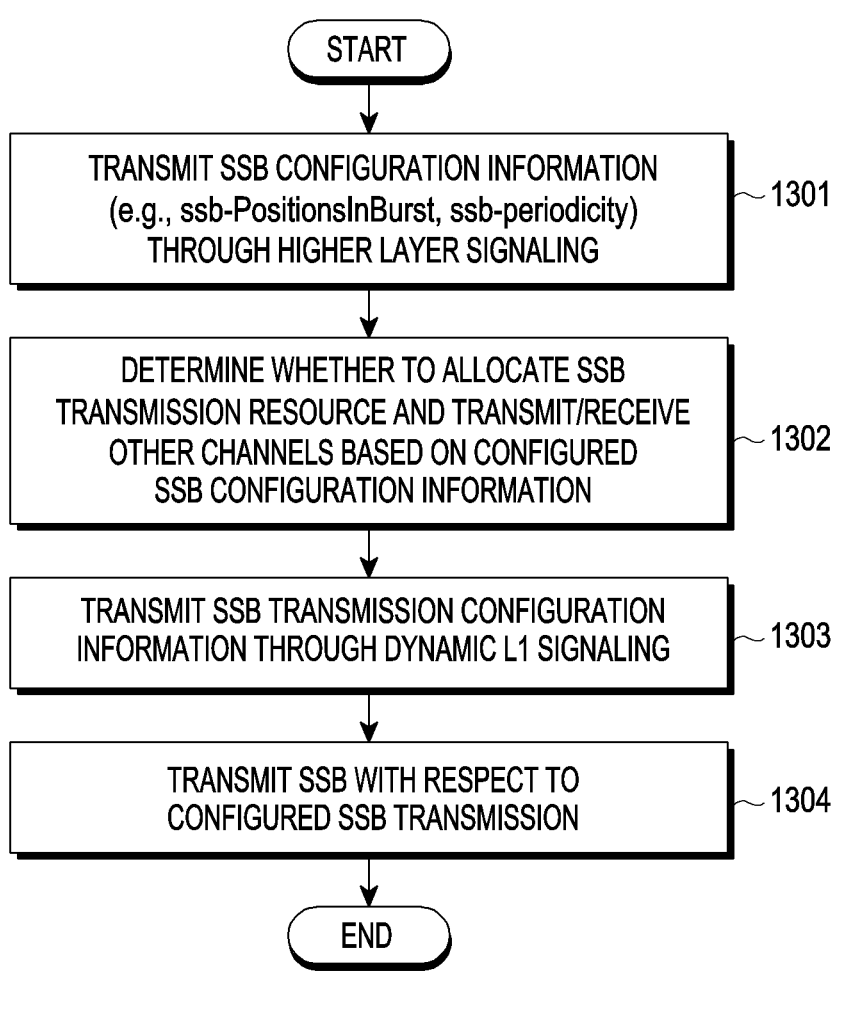
FIG. 13 is a flowchart of a base station for reconfiguring SSB transmission through dynamic signaling of a 5G system according to an embodiment of the disclosure.

FIG. 13 is a flowchart illustrating operations of a base station to reconfigure SSB transmission through dynamic signaling according to an embodiment of the disclosure. In various embodiments, at least one of the operations described below may be omitted, modified, or changed in order. The dynamic signaling (dynamic DCI) may use the group common DCI or the UE specific DCI.

Referring to FIG. 13, in operation 1301, the base station may transmit information related to SSB configurations, e.g., ssb-PositionsInBurst information indicating the SSB transmission position and ssb-periodicity indicating the SSB transmission period, to the UE through higher layer signaling (e.g., SIB1 or ServingCellConfigCommon). The SSB configuration information provided through the higher layer signaling (e.g., SIB1 or ServingCellConfigCommon) is SSB configuration information applicable in the normal mode.

In operation 1302, the base station may determine whether to transmit/receive resources and other channels (e.g., PUCCH, PUCCH, PDSCH, and PDCCH) for transmitting the SSB based on the first SSB configuration information configured through higher layer signaling. In operation 1303, the base station may transmit second SSB configuration information for energy savings to the UE through L1 signaling (e.g., group common DCI or UE specific DCI indicating one or more UEs). In this case, the base station may not transmit the SSB based on the second SSB configuration information. In other words, the base station may not transmit the SSB based on at least one of bitmap information indicating whether to cancel transmission of SSBs included in the second SSB configuration information, offset information indicating the start time of the SSB transmission cancellation operation, ssb-periodicity indicating the SSB transmission period information, or timer information.

Thereafter, in operation 1304, the base station may transmit the SSB based on the second SSB configuration information configured through L1 signaling.

As in the above-described embodiments, the base station may configure SSB transmission to the UE through higher layer signaling and may then reconfigure SSB configuration information through dynamic signaling (group common DCI or UE specific DCI). In this case, when SSB transmission is canceled with respect to the SSB configuration information reconfigured through dynamic signaling, the UE may determine that the RACH occasion (RO) related to the SSB is also canceled. For example, when four SSBs {SSB #0, SSB #1, SSB #2, SSB #3} are connected to RACH occasions (ROs) {RO #0, RO #1, RO #2, RO #3}, respectively, if SSB #1 and SSB #2 are canceled through dynamic signaling from the base station, the UE may determine that the corresponding RO #1 and RO #2 are also canceled. Further, in determining the candidate SSB for RRM measurement, RRM measurement may be performed based on the SSB configuration information of dynamic signaling proposed herein, as well as the SSB transmission configured through higher layer signaling (e.g., SIB1 or ServingCell-ConfigCommon)).

Third Embodiment

The third embodiment describes additional operations of the base station and the UE according to reconfiguration of SSB configuration information through dynamic signaling (group common DCI or UE specific DCI) for energy savings. In the following description, a state of applying the operation of saving energy by the base station and UE to be distinguished from conventional base station and UE operations is referred to as an energy saving mode (ES mode), and a state of the base station, of applying conventional base station operations is referred to as a base station normal mode.

When the SSB reconfiguration method through dynamic signaling according to the first embodiment or second embodiment applies, the UE may determine whether to transmit/receive other channels, e.g., PUSCH, PUCCH, PDSCH, PDCCH, and SRS, according to cancellation of SSB transmission. Further, it is possible to determine whether to simultaneously estimate according to reconfiguration of SSB configuration information upon simultaneous channel estimation TB processing over multi-slot PUSCH (TBoMS) and PUSCH/PUCCH repeated transmission.

In the normal operation mode, if the UE has SSB transmission configured thereto from the base station through higher layer signaling, the UE determines whether to transmit other channels considering resources for SSB reception. Thereafter, if the base station reduces the density of SSB transmission by reconfiguring SSB configuration information through dynamic signaling for the energy saving mode, the base station does not transmit the SSB, and is also considered to be in a mode in which transmission/reception of other channels is also impossible to save energy, so that the UE may not use the SSB transmission-canceled resources for transmission/reception of other channels. Therefore, the UE may determine whether to transmit/receive other channels through SIB1 (or ServingCellConfigCommon) to determine whether to transmit/receive other channels, and whether to receive the SSB may be performed through SSB configuration information reconfigured through dynamic signaling. In contrast, when the base station cancels the SSB transmission configured through dynamic signaling, if the base station configures whether transmission/reception of other channels is possible in the time domain of the canceled SSB resource through dynamic signaling, the UE may transmit/receive other channels through the canceled SSB resource.

When the SSB reconfiguration method through dynamic signaling of the first embodiment or second embodiment of the disclosure applies, and simultaneous channel estimation is enabled, the UE may separately perform simultaneous channel estimation upon repeated transmission of PUSCH and PUCCH with respect to the time of SSB reception considering that the SSB reception resource configured through conventional higher layer signaling is an event that causes it impossible to maintain the phase continuity and power consistency. In this case, if the existing SSB transmission present in the middle of the simultaneous channel estimation period is omitted as SSB configuration information is reconfigured through dynamic signaling from the base station of the first embodiment or second embodiment of the disclosure, the UE does not consider it as an event based on the reconfigured SSB configuration information and may maintain and transmit the power and phase of PUSCH, PUCCH, and TBoMS for simultaneous channel estimation. Further, the SSB transmission resources configured through the conventional higher layer signaling and the SSB transmission resources configured through dynamic signaling may be divided and applied depending on purposes. Further, the base station may repeatedly transmit dynamic signaling to increase the reliability of dynamic signaling and may additionally configure Ack/Nack feedback according to dynamic signaling.

Figure 14:
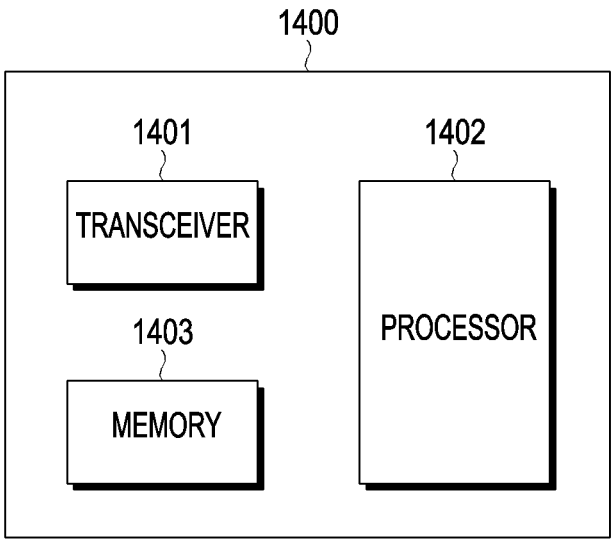
FIG. 14 is a block diagram illustrating a UE according to an embodiment of the disclosure.

FIG. 14 is a block diagram illustrating a UE according to an embodiment of the disclosure.

Referring to FIG. 14, a UE 1400 may include a transceiver 1401, a controller (e.g., processor) 1402, and a storage unit (e.g., memory) 1403. The transceiver 1401, controller 1402, and storage unit 1403 of the UE 1400 may be operated according to at least one or a combination of the methods corresponding to the above-described embodiments. However, the components of the UE 1400 are not limited to the shown examples. According to an embodiment, the UE 1400 may include more or fewer components than the above-described components. According to an embodiment, the transceiver 1401, the controller 1402, and the storage unit 1403 may be implemented in the form of a single chip.

According to an embodiment, the transceiver 1401 may include a transmitter and a receiver. Further, the transceiver 1401 may be referred to as a transmission/reception unit. The UE 1400 may transmit/receive signal(s) to/from the base station through the transceiver 1401. The signals may include control information and data. The transceiver 1401 may include an RF transmitter for frequency-up converting and amplifying signals transmitted and an RF receiver for low-noise amplifying signals received and frequency-down converting the frequency of the received signals. The transceiver 1401 may receive signals via a radio channel, output the signals to the controller 1402, and transmit signals output from the controller 1402 via a radio channel.

The controller 1402 may control a series of procedures for the UE to be able to operate according to each or, a combination of two or more of, the above-described embodiments. For example, the controller 1402 may perform or control the operations of the UE to perform at least one or a combination of the methods according to embodiments of the disclosure. The controller 1402 may include at least one processor. For example, the controller 1402 may include a communication processor (CP) that performs control for communication and an application processor (AP) that controls an upper layer, such as an application program.

The storage unit 1403 may store control information (e.g., the above-described first and second SSB configuration information and information related to channel estimation using DMRSs transmitted in the PUSCH included in the signal obtained by the UE 1400) or data, and may have an area for storing data necessary for control by the controller 1402 and data generated when controlled by the controller 1402.

Figure 15:
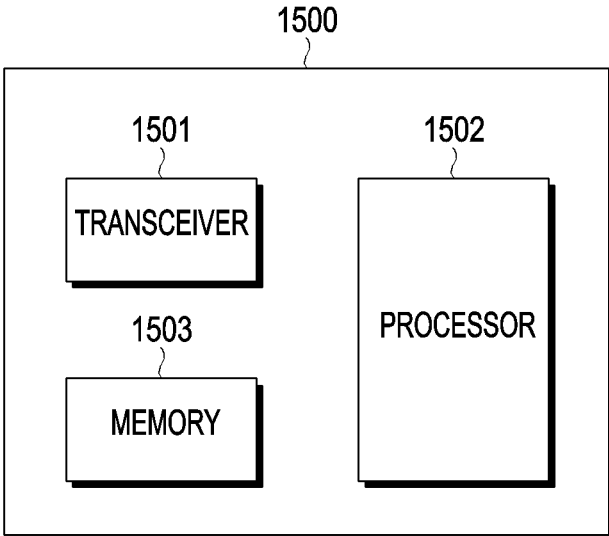
FIG. 15 is a block diagram illustrating a base station according to an embodiment of the disclosure.

FIG. 15 is a block diagram illustrating a base station according to an embodiment of the disclosure.

Referring to FIG. 15, a base station 1500 may include a transceiver 1501, a controller (e.g., processor) 1502, and a storage unit (e.g., memory) 1503. The transceiver 1501, controller 1502, and storage unit 1503 of the base station 1500 may be operated according to at least one or a combination of the methods corresponding to the above-described embodiments. However, the components of the base station 1500 are not limited to the shown examples. According to an embodiment, the base station 1500 may include more or fewer components than the above-described components. According to an embodiment, the transceiver 1501, the controller 1502, and the storage unit 1503 may be implemented in the form of a single chip.

According to an embodiment, the transceiver 1501 may include a transmitter and a receiver. Further, the transceiver 1501 may be referred to as a transmission/reception unit. The base station 1500 may transmit/receive signal(s) to/from the UE through the transceiver 1501. The signals may include control information and data. The transceiver 1501 may include an RF transmitter for frequency-up converting and amplifying signals transmitted and an RF receiver for low-noise amplifying signals received and frequency-down converting the frequency of the received signals. The transceiver 1501 may receive signals via a radio channel, output the signals to the controller 1502, and transmit signals output from the controller 1502 via a radio channel.

The controller 1502 may control a series of procedures for the base station 1500 to be able to operate according to each or, a combination of two or more of, the above-described embodiments. For example, the controller 1502 may perform or control the operations of the base station to perform at least one or a combination of the methods according to embodiments of the disclosure. The controller 1502 may include at least one processor. For example, the controller 1502 may include a communication processor (CP) that performs control for communication and an application processor (AP) that controls an upper layer, such as an application program.

The storage unit 1503 may store control information (e.g., the above-described first and second SSB configuration information and information related to channel estimation, generated using DMRSs transmitted in the PUSCH determined by the base station 1500), data, or control information or data received from the UE and may have an area for storing data necessary for control by the controller 1502 and data generated when controlled by the controller 1502.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:
   receiving, from a base station, first configuration information about a synchronization signal block (SSB);
   receiving, from the base station, second configuration information about the SSB, the second configuration information including information indicating whether to cancel SSB transmission; and
   determining whether to receive the SSB based on the first configuration information and the second configuration information,
   wherein the second configuration information includes bitmap information indicating whether to cancel the SSB transmission, and offset information indicating when the cancellation of the SSB transmission begins.

2. The method of claim 1,
   wherein the second configuration information is received from the base station through dynamic signaling, and
   wherein the dynamic signaling uses at least one of group common downlink control information (DCI) or UE-specific DCI.

3. The method of claim 2, wherein the group common DCI and the UE-specific DCI are identified by a specific radio network temporary identifier (RNTI) allocated for energy saving.

4. The method of claim 2,
   wherein the group common DCI is broadcast to a plurality of UEs in a cell of the base station, and
   wherein the UE-specific DCI is provided to one or more UEs in the cell of the base station.

5. The method of claim 1,
   wherein the second configuration information includes at least one of:
      information indicating SSB transmission period information, and
      timer information indicating a period during which the second configuration information is applied, and
   wherein the first configuration information is reset based on the second configuration information.

6. A user equipment (UE) in a wireless communication system, the UE comprising:
   a transceiver; and
   a processor configured to:
      receive, through the transceiver from a base station, first configuration information about a synchronization signal block (SSB),
      receive, through the transceiver from a base station, second configuration information about the SSB, the second configuration information including information indicating whether to cancel SSB transmission, and transmission, and
      determine whether to receive the SSB based on the first configuration information and the second configuration information,
   wherein the second configuration information includes bitmap information indicating whether to cancel the SSB transmission, and offset information indicating when the cancellation of the SSB transmission begins.

7. The UE of claim 6,
   wherein the second configuration information is received from the base station through dynamic signaling, and
   wherein the dynamic signaling uses at least one of group common downlink control information (DCI) or UE-specific DCI.

8. The UE of claim 7, wherein the group common DCI and the UE-specific DCI are identified by a specific radio network temporary identifier (RNTI) allocated for energy saving.

9. The UE of claim 7,
   wherein the group common DCI is broadcast to a plurality of UEs in a cell of the base station, and
   wherein the UE-specific DCI is provided to one or more UEs in the cell of the base station.

10. The UE of claim 6,
   wherein the second configuration information includes at least one of:
      information indicating SSB transmission period information, and
      timer information indicating a period during which the second configuration information is applied, and
   wherein the first configuration information is reset based on the second configuration information.

11. A method performed by a base station in a wireless communication system, the method comprising:
   transmitting first configuration information about a synchronization signal block (SSB);
   transmitting second configuration information about the SSB including information indicating whether to cancel SSB transmission; and
   determining whether to transmit the SSB based on the first configuration information and the second configuration information,
   wherein the second configuration information bitmap information indicating whether to cancel the SSB transmission, and offset information indicating when the cancellation of the SSB transmission begins.

12. The method of claim 11,
   wherein the second configuration information is transmitted through dynamic signaling, and
   wherein the dynamic signaling uses at least one of group common downlink control information (DCI) or UE-specific DCI.

13. The method of claim 12, wherein the group common DCI and the UE-specific DCI are identified by a specific radio network temporary identifier (RNTI) allocated for energy saving.

14. The method of claim 12,
   wherein the group common DCI is broadcast to a plurality of UEs in a cell of the base station, and wherein the UE-specific DCI is provided to one or more UEs in the cell of the base station.

15. The method of claim 11,
wherein the second configuration information includes at least one of:
    information indicating SSB transmission period information, and
    timer information indicating a period during which the second configuration information is applied, and
wherein the first configuration information is reset based on the second configuration information.

16. A base station in a wireless communication system, the base station comprising:
a transceiver; and
a processor configured to:
    transmit, through the transceiver, first configuration information about a synchronization signal block (SSB),
    transmit, through the transceiver, second configuration information about the SSB, the second configuration information including information indicating whether to cancel SSB transmission, and
    determine whether to transmit the SSB based on the first configuration information and the second configuration information,
wherein the second configuration information includes bitmap information indicating whether to cancel the SSB transmission, and offset information indicating when the cancellation of the SSB transmission begins.

17. The base station of claim 16,
wherein the second configuration information is transmitted through dynamic signaling, and
wherein the dynamic signaling uses at least one of group common downlink control information (DCI) or UE-specific DCI.

18. The base station of claim 17, wherein the group common DCI and the UE-specific DCI are identified by a specific radio network temporary identifier (RNTI) allocated for energy saving.

19. The base station of claim 17,
wherein the group common DCI is broadcast to a plurality of UEs in a cell of the base station, and
wherein the UE-specific DCI is provided to one or more UEs in the cell of the base station.

20. The base station of claim 16,
wherein the second configuration information includes at least one of:
    information indicating SSB transmission period information, and
    timer information indicating a period during which the second configuration information is applied, and
wherein the first configuration information is reset based on the second configuration information.

* * * * *